United States Patent
Iwatsuka

(10) Patent No.: US 7,002,732 B2
(45) Date of Patent: Feb. 21, 2006

(54) MAGNETO-OPTICAL DEVICES

(75) Inventor: Shinji Iwatsuka, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/923,873

(22) Filed: Aug. 24, 2004

(65) Prior Publication Data

US 2005/0146769 A1    Jul. 7, 2005

(30) Foreign Application Priority Data

Aug. 29, 2003   (JP)   ............................ 2003-305755
Jul. 21, 2004   (JP)   ............................ 2004-212621

(51) Int. Cl.
     *G02F 1/00*        (2006.01)
     *G02F 1/09*        (2006.01)

(52) U.S. Cl. ........................ 359/324; 359/281; 359/283

(58) Field of Classification Search ................ 359/280, 359/281, 282, 283, 284, 324
See application file for complete search history.

(56) References Cited

U.S. PATENT DOCUMENTS 3,420,601 A    1/1969    Young et al. ................. 359/282
4,239,337 A    12/1980    Campbell et al. ............ 359/324
5,657,151 A    8/1997    Swan et al. .................. 359/281

FOREIGN PATENT DOCUMENTS

JP        A 6-51255      2/1994
JP        A 7-199137     8/1995

OTHER PUBLICATIONS

Ikeda et al., "Arbitrary and Endless Polarization Controller," Furukawa review, No. 23, pp. 32-38, Jan. 2003 w/English Translation.

*Primary Examiner*—David N. Spector
(74) *Attorney, Agent, or Firm*—Oliff & Berridge, PLC

(57) ABSTRACT

The invention provides small-sized, power-saving and easily-producible magneto-optical devices. The magneto-optical device comprises a Faraday rotator having nearly parallel surfaces and a Z-direction magnetic easy axis; a total reflection film formed partly on one surface of the Faraday rotator; another total reflection film formed partly on the other surface thereof; a light input region through which light enters the Faraday rotator; a light output region through which the light having alternately reflected on the total reflection films goes out of the Faraday rotator; a permanent magnet that forms a predetermined magnetic domain structure in the Faraday rotator and applies a magnetic field component in the Z-direction to the Faraday rotator so that the magnetization direction could be the same both in the light input region and the light output region; and an electromagnet that varies the position at which the magnetic field component applied to the Faraday rotator is 0 (zero).

10 Claims, 25 Drawing Sheets

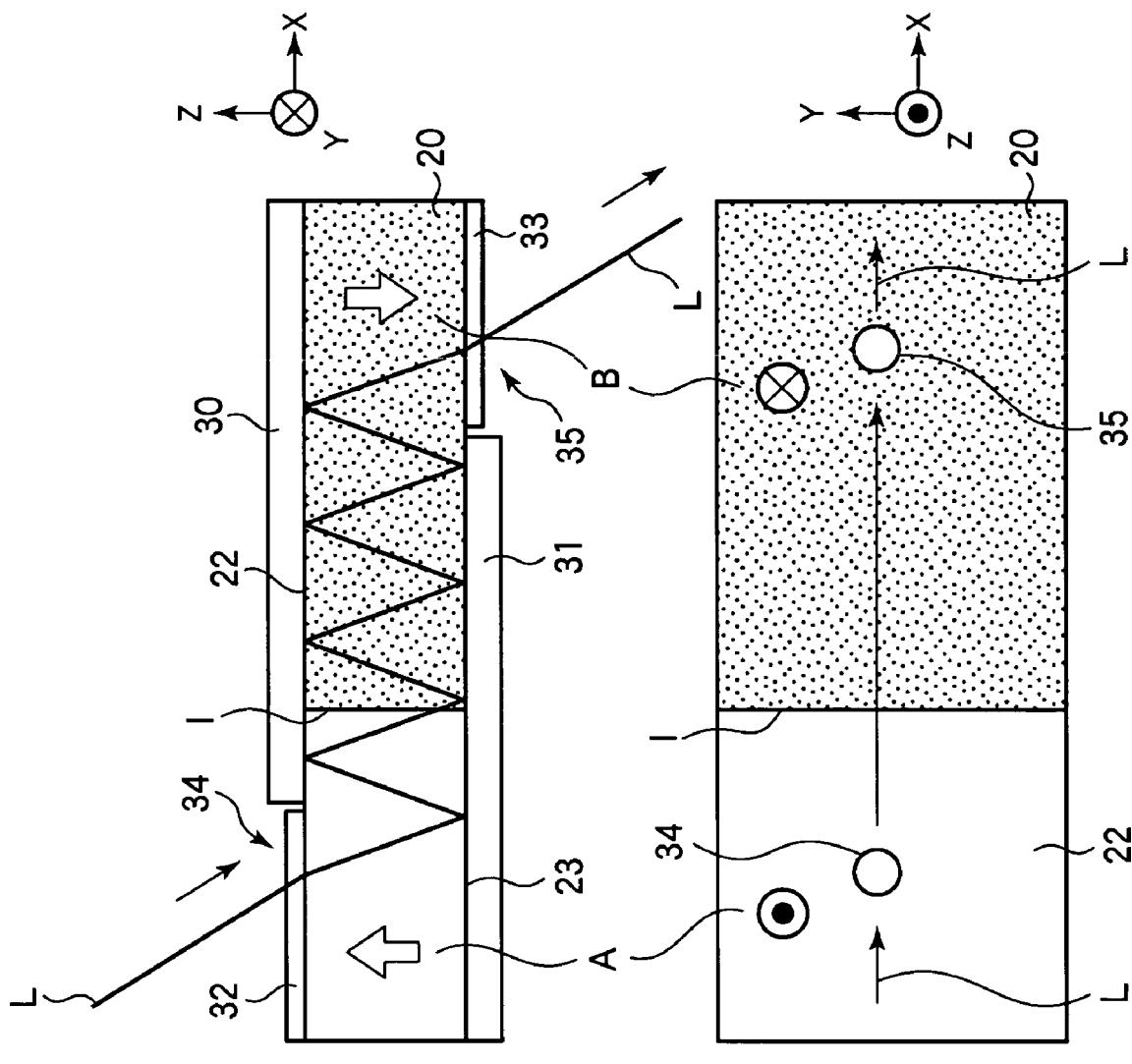

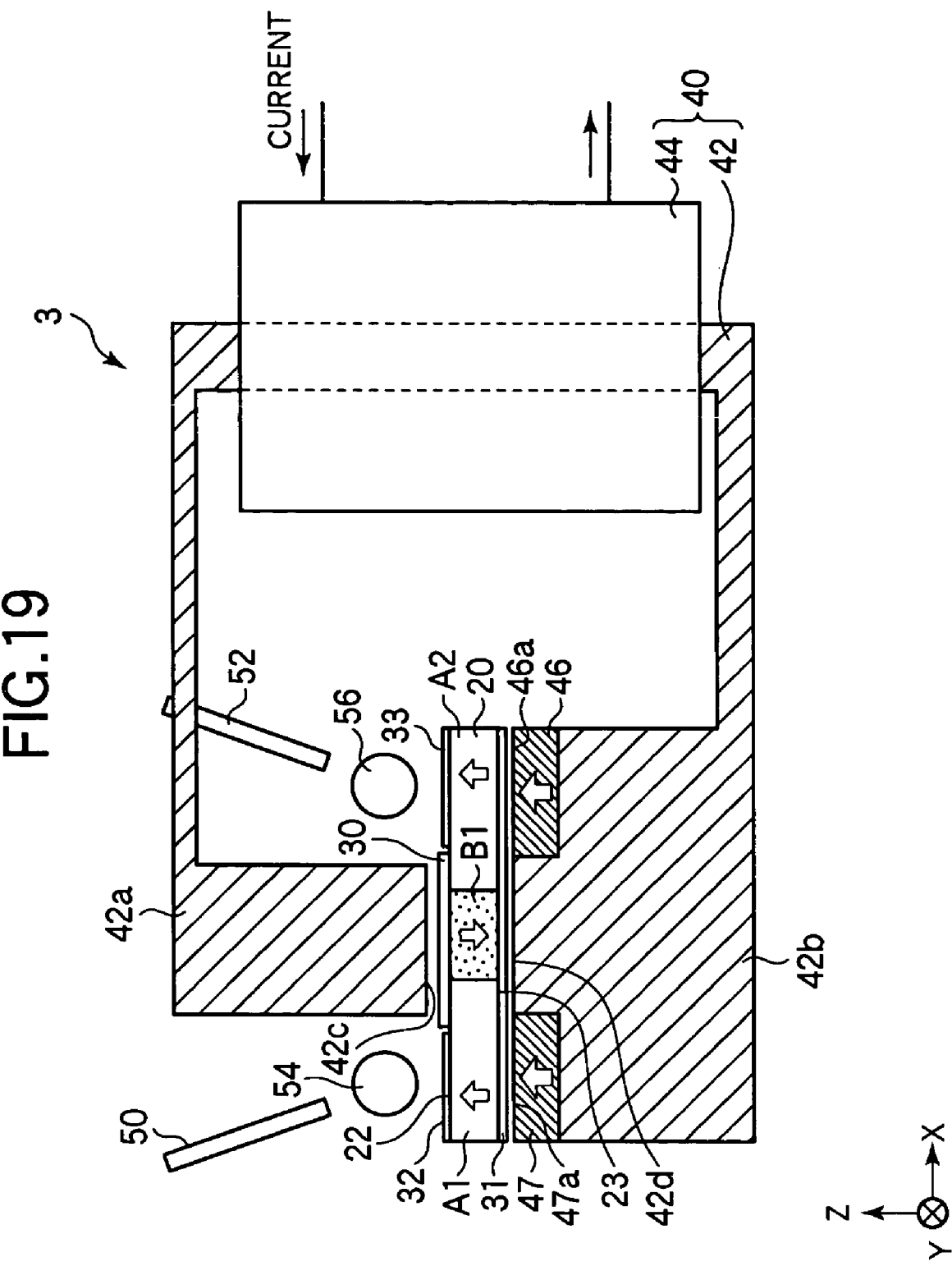

MAGNETO-OPTICAL DEVICES

BACKGROUND OF THE INVENTION

1. Field of the Invention

The present invention relates to magneto-optical devices, especially such as polarization controller, optical modulator, variable optical attenuator, optical isolator, optical circulator, or the like.

2. Description of Related Art

In high-speed optical communication at a transmission speed of 40 Gbps or so, polarization mode dispersion (PMD) is one essential factor of transmission failure. Recently, therefore, polarization mode dispersion compensators capable of compensating for the influence of polarization mode dispersion have become much investigated. One essential constitutive device of such a PMD compensator is a polarization controller of controlling the polarization condition of light. As disclosed in Non-Patent Document 1, lithium niobate (LN), liquid crystal, fiber squeezer, variable Faraday rotator and the like are known as the optical device to constitute a polarization controller. In particular, a polarization controller that comprises a variable Faraday rotator takes a satisfactorily short response time of a few hundreds μsec, and its structure is composed of a garnet crystal. Therefore, the optical properties such as the insertion loss and the polarization dependency loss (PDL) of the polarization controller of the type as well as the reliability thereof could be nearly on the same level as that of conventional passive modules. Accordingly, when a variable Faraday rotator is used, then a polarization controller having a better balance than any other devices can be constructed (see Non-Patent Document 1). The variable Faraday rotator comprises a magneto-optical crystal and an electromagnet that imparts an electric field to the magneto-optical crystal. This is so designed that the quantity of current to run through the electromagnet is varied so as to control the intensity of the magnetic field to be applied to the magneto-optical crystal, and the intensity of the magnetization of the magneto-optical crystal is thereby varied so as to control the Faraday rotation angle.

A method of controlling the magnetic field to be applied to the magneto-optical crystal is disclosed, for example, in Patent Document 1. The magnetic field controlling method is described with reference to FIG. 25A and FIG. 25B. FIG. 25A shows a variable optical attenuator, and the variable optical attenuator comprises a Faraday rotator (magneto-optical crystal) 113 and a polarizer 112. In addition, the variable optical attenuator further comprises a permanent magnet 114 and an electromagnet 115 that impart a magnetic field to the Faraday rotator 113 in two directions perpendicular to each other, and a variable current source 116 to give a driving current to the electromagnet 115.

The direction of the magnetic field applied to the Faraday rotator 113 by the permanent magnet 114 is parallel to the direction in which the light beam 117 runs through the Faraday rotator 113, and the direction of the magnetic field applied to the Faraday rotator 113 by the electromagnet 115 is perpendicular to the direction of the magnetic filed given by the permanent magnet 114 and to the running direction of the light beam 117.

In FIG. 25B, the arrows 102 and 105 are vectors each indicating the direction and the intensity of the magnetization inside the Faraday rotator 113; the arrows 101 and 103 are vectors each indicating the direction and the intensity of the external magnetic field; the arrow 104 is a vector indicating the direction and the intensity of the synthetic magnetic field of the two magnetic fields indicated by the arrows 101 and 103. In the drawing, the direction Z indicates the light propagation direction in the Faraday rotator 113, and the direction X is perpendicular to the direction Z. The Faraday rotator 113 is in the condition of saturation magnetization 102 owing to the Z-direction magnetic field 101 given by the external permanent magnet 114. Next, when the X-direction magnetic field 103 is given to it by the electromagnet 115, then the external magnetic field forms the synthetic magnetic field 104, and the Faraday rotator 113 is in the condition of magnetization 105. The intensity of the magnetization 105 is the same as that of the saturation magnetization 102, and therefore the Faraday rotator 113 is in the condition of saturation magnetization.

As in the above, the Z-direction magnetic field 101 is previously given to the Faraday rotator 113 by the permanent magnet 114 so that the Faraday rotator 113 is in the condition of saturation magnetization, and further the X-direction magnetic field 103 is given to the Faraday 113 by the electromagnet 115. With that, the magnetization direction of the Faraday rotator 113 is rotated by the degree θ from the magnetization 102 to the magnetization 105 by the synthetic magnetic field 104 of the two magnetic fields 101 and 103, and the intensity of the magnetization component 106 in the Z-direction is thereby controlled. Depending on the intensity of the magnetization component 106, the Faraday rotation angle varies. In the case of this method, the Faraday rotator 113 is driven all the time in the saturation magnetization region, and therefore the method is characterized in that the Faraday rotation angle can be varied with good reproducibility with no hysteresis.

However, according to the magnetic field application method described in Patent Document 1, the magnetization is uniformly rotated while the magnetic field 101 is given to the system by the permanent magnet 114, and therefore the magnetic field 103 to be given thereto by the electromagnet 115 must be strong. Accordingly, the electromagnet 115 must be large-sized, or a large current must be applied to the electromagnet 115. This produces a problem in that the size of the magneto-optical device of the type is difficult to reduce and the power to be consumed by structure is also difficult to reduce.

The Faraday rotator 113 is formed of a magnetic garnet single-crystal film that is grown in a method of liquid-phase epitaxial (LPE) growth. Light transmission through a magnetic garnet single-crystal film in the direction along the growing face of the film lowers the characteristics such as the extinction ratio of the film. Therefore, in general, light is applied to the film in the direction perpendicular to the growing face of the film. In this case, however, the thickness of the Faraday rotator 113 in the direction perpendicular to the growing face of the film is at most 400 μm or so, and the obtainable Faraday rotation angle could be 45° or so. Accordingly, the polarization controller that requires a variable polarization rotation angle range of at least 180 degrees must use multiple (in general, 6 to 8) Faraday rotators 113. This is further problematic in that the size of the magneto-optical device of the type is difficult to reduce and the power to be consumed by structure is also difficult to reduce.

Patent Document 1: Japanese Patent No. 2,815,509
Patent Document 2: U.S. Pat. No. 5,657,151
Patent Document 3: JP-A 7-199137
Patent Document 4: U.S. Pat. No. 4,239,337
Patent Document 5: U.S. Pat. No. 3,420,601
Non-Patent Document 1: Kazuhiro Ikeda and 5 others, Endless Tracking Polarization Controller, Furukawa review, January 2003, No. 23, pp. 32–38

SUMMARY OF THE INVENTION

An object of the present invention is to provide small-sized, power-saving, low-cost magneto-optical devices.

The object can be attained by a magneto-optical device that comprises a magneto-optical crystal having first and second surfaces opposite to each other; a first total reflection part disposed at least partly on the first surface side of the magneto-optical crystal; a second total reflection part disposed at least partly on the second surface side of the magneto-optical crystal; a light input region in which light enters the magneto-optical crystal; a light output region in which the light reflected alternately in the first and second total reflection parts goes out of the magneto-optical crystal; and a magnetic field application structure of applying a magnetic field to the magneto-optical crystal in such a manner that there exists no magnetic domain wall in the light input region and the light output region.

In the magneto-optical device as above, the magnetic field application structure preferably applies a magnetic field to the magneto-optical crystal in such a manner that the magnetization direction could be the same both in the light input region and in the light output region.

In the magneto-optical device above, the light input region is preferably on the first surface, and the light output region is on the second surface.

In the magneto-optical device above, the light input region and the light output region are preferably both on the first surface.

In the magneto-optical device above, the magneto-optical crystal preferably has a predetermined magnetic easy axis, and includes a magnetic domain A magnetized in one direction parallel to the magnetic easy axis and a magnetic domain B magnetized in the opposite direction to the magnetization direction of the magnetic domain A.

In the magneto-optical device above, the magnetic field application structure preferably comprises an electromagnet capable of varying the position in which the magnetic field component applied to the magneto-optical crystal in parallel to the magnetic easy axis could be 0 (zero), and at least one permanent magnet disposed correspondingly to every magnetic domain of the magneto-optical crystal.

In the magneto-optical device above, the magnetic field application structure preferably comprises at least one permanent magnet of applying a fixed magnetic field to the magneto-optical crystal, and an electromagnet of applying thereto a variable magnetic field in the direction different from the direction of the fixed magnetic field, and it varies the intensity of the variable magnetic field so that the intensity of the synthetic magnetic field of the variable magnetic field and the fixed magnetic field is not lower than the intensity of the saturation magnetic field of the magneto-optical crystal, and varies the magnetization direction of the magneto-optical crystal.

The object of the invention can be also attained by a magneto-optical device that comprises a magneto-optical crystal having first and second surfaces opposite to each other; a first total reflection part disposed at least partly on the first surface side of the magneto-optical crystal; a second total reflection part disposed at least partly on the second surface side of the magneto-optical crystal; a light input region in which light enters the magneto-optical crystal; a light output region in which the light reflected alternately on the surfaces of the first and second total reflection parts goes out of the magneto-optical crystal; and a magnetic field application structure that comprises an electromagnet having a yoke with one end thereof disposed adjacent to the back face of the first total reflection part and the other end thereof disposed adjacent to the back of the second total reflection part, and a coil wound around the yoke, and capable of applying a variable magnetic field to the magneto-optical crystal, and at least one permanent magnet of applying a fixed magnetic field to the magneto-optical crystal.

In the magneto-optical device above, the magneto-optical crystal preferably has a predetermined magnetic easy axis, and includes a magnetic domain A magnetized in one direction parallel to the magnetic easy axis and a magnetic domain B magnetized in the opposite direction to the magnetization direction of the magnetic domain A.

In the magneto-optical device above, the direction of the variable magnetic field preferably differs from the direction of the fixed magnetic field, and the magnetic field application structure varies the intensity of the variable magnetic field so that the intensity of the synthetic magnetic field of the variable magnetic field and the fixed magnetic field is not lower than the intensity of the saturation magnetic field of the magneto-optical crystal, and varies the magnetization direction of the magneto-optical crystal.

Providing the above, the invention realizes small-sized, power-saving, low-cost magneto-optical devices.

BRIEF DESCRIPTION OF THE DRAWINGS

FIG. 2A and FIG. 2B are views showing the outline of an essential part of the magneto-optical device of the first embodiment of the invention;

FIG. 19 is a view showing the outline of a magneto-optical device of the third embodiment of the invention;

DESCRIPTION OF THE PREFERRED EMBODIMENTS

<First Embodiment of the Invention>

Figure 1:
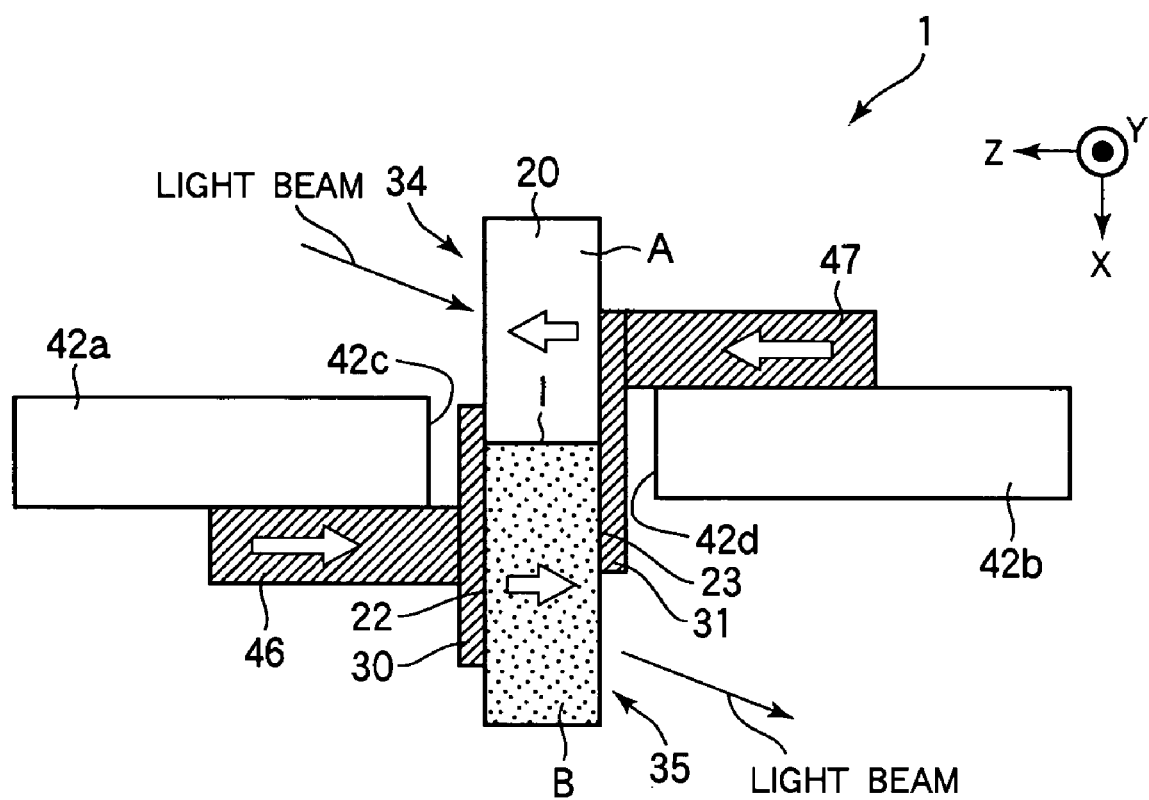
FIG. 1 is a view showing the outline of a magneto-optical device of the first embodiment of the invention.

The magneto-optical device of the first embodiment of the invention is described with reference to FIG. 1 to FIG. 2B. FIG. 1 shows the outline of a magneto-optical device 1 of this embodiment; and FIG. 2A and FIG. 2B show the outline of an essential part of the magneto-optical device 1. In FIG. 1 to FIG. 2B, the axis X is in the plane parallel to the light-entering face of the magneto-optical crystal of the magneto-optical device 1, and this is the running direction of the light beam having entered the crystal through the plane; and the axis Y is in the same plane and is perpendicular to the axis X. The axis Z is perpendicular to that plane through which light enters the crystal and goes out of it. FIG. 1 shows the outline of the magneto-optical device 1 seen in the −Y direction; FIG. 2A shows the outline of an essential part of the magneto-optical device 1 seen in the +Y direction; and FIG. 2B shows the outline of the essential part thereof seen in the −Z direction.

As in FIG. 1 to FIG. 2B, the magneto-optical device 1 has a Faraday rotator 20 of a magneto-optical crystal. The Faraday rotator 20 is formed of, for example, a magnetic garnet single-crystal film produced in a method of LPE, and has the ability of vertical magnetization to give a magnetic easy axis in the direction perpendicular to the growing face of the film (direction Z). The Faraday rotator 20 has a nearly rectangular parallelepiped form, and has surfaces 22 and 23 opposite to each other and both parallel to the X,Y planes.

An anti-reflection film 32 (not shown in FIG. 1 and FIG. 2B) is formed in the vicinity of the light input region 34 of one surface 22 through which a light beam enters the structure. In the other part of the surface 22, formed is a total reflection film (total reflection part) 30 (not shown in FIG. 2B). An anti-reflection film 33 (not shown in FIG. 1 and FIG. 2B) is formed in the vicinity of the light output region 35 of the other surface 23 through which the light beam goes out of the structure. In the other part of the surface 23, formed is a total reflection film 31 (not shown in FIG. 2B). The light input region 34 is positioned on the −X side of the Faraday rotator 20; and the light output region 35 is on the +X side thereof. The total reflection films 30 and 31 are formed on the surfaces 22 and 23, respectively of the Faraday rotator 20 through vapor deposition of a multi-layered dielectric film or a thin metal film of aluminium or the like. When seen in the direction Z, only the total reflection film 31 of the total reflections films 30 and 31 is formed in the area around the light input region 34; and only the total reflection film 30 of the two is formed in the area around the light output region 35. In the area between the light input region 34 and the light output region 35, the total reflection films 30 and 31 are formed to overlap with each other. A light beam enters the Faraday rotator 20 through the light input region 34, and is alternately reflected many times on the surfaces of the total reflection films 31 and 30 (multiple reflection), and then goes out through the light output region 35. In place of directly forming the total reflection films 30 and 31 on the surfaces 22 and 23, respectively, of the Faraday rotator 20, a substrate (e.g., glass substrate) having the total reflection film 30 formed thereon may be disposed on the side of the surface 22 of the Faraday rotator and a substrate having the total reflection film 31 formed thereon may be on the side of the surface 23 thereof. The two substrates are disposed, for example, nearly in contact with the surfaces 22 and 23 of the Faraday rotator 20. In place of the total reflection films 30 and 31, a polished metal face or the like may be used for the total reflection parts.

The magneto-optical device 1 has an electromagnet (magnetic field application structure) comprising, for example, a C-shaped yoke (electromagnetic yoke) 42 (in FIG. 1, only the two ends 42a and 42b of the yoke 42 are shown), and a coil wound around the yoke 42. One end 42a of the yoke 42 is disposed adjacent to the back of the total reflection film 30 so that its tip face 42c may face the back of the total reflection film 30. The other end 42b of the yoke 42 is disposed adjacent to the back of the total reflection film 31 so that its tip face 42d may face the back of the total reflection film 31. The yoke 42 is so disposed that the tip face 42c of one end 42a thereof and the tip face 42d of the other end 42b thereof may face each other nearly via the center part of the Faraday rotator 20 sandwiched therebetween.

Adjacent to one end 42a of the yoke 42 in the +X direction thereof, for example, a permanent magnet (magnetic field application structure) 46 such as ferrite magnet, rare earth magnet or the like is disposed. The magnetic flux inside the permanent magnet 46 runs in the −Z direction as shown by the arrow in the drawing (that is, the magnetization of the permanent magnet 46 is in the −Z direction.) The tip face on the −Z side of the permanent magnet 46 is kept in contact, for example, with the back of the total reflection film 30. Adjacent to other end 42b of the yoke 42 in the −X direction thereof, a permanent magnet 47 is disposed. The magnetic flux inside the permanent magnet 47 runs in the +Z direction (that is, the magnetization of the permanent magnet 47 is in the +Z direction.) The tip face on the +Z side of the permanent magnet 47 is kept in contact, for example, with the back of the total reflection film 31.

In the −X side area of the Faraday rotator 20, the intensity of the magnetic field component in the +Z direction given by the permanent magnet 47 is not lower than that of the saturation magnetic field (the magnetic field necessary for saturating the magnetization of the Faraday rotator 20). Accordingly, this region is a magnetic domain A magnetized in the +Z direction, as shown by the arrow in the drawing. In the +X side area of the Faraday rotator 20, the intensity of the magnetic field component in the −Z direction given by the permanent magnet 46 is not lower than that of the saturation magnetic field. Accordingly, this region is a magnetic domain B magnetized in the −Z direction. Between the magnetic domain A region and the magnetic domain B region, formed is a magnetic domain wall I serving as a boundary region (boundary interface). At the magnetic domain wall I, the Z-direction component of the magnetic field applied to the structure is nearly 0 (zero). In this embodiment, the light input region 34 is positioned in the region of the magnetic domain A; and the light output region 35 is in the region of the magnetic domain B. When the Faraday rotation angle per the unit optical path length in the region of the magnetic domain A of the Faraday rotator 20 is +θfs (saturated Faraday rotation angle), then the Faraday rotation angle per the unit optical path length in the region of the magnetic domain B thereof is −θfs.

When a current is applied to run through the coil of the electromagnet, then the Faraday rotator 20 around the region sandwiched between the two ends 42a and 42b of the yoke 42 receives, for example, a +Z direction magnetic field applied thereto. Accordingly, the magnetic domain wall I moves in the +X direction. In other words, the region of the magnetic domain A becomes broad in accordance with the intensity of the applied magnetic field, while the region of the magnetic domain B is thereby narrowed. On the other hand, when an opposite current is applied to run through the coil of the electromagnet, then the Faraday rotator 20 around the region sandwiched between the two ends 42a and 42b of the yoke 42 receives a −Z direction magnetic field applied thereto. Accordingly, the magnetic domain wall I moves in the −X direction. In other words, the region of the magnetic domain A is narrowed in accordance with the intensity of the applied magnetic field, while the region of the magnetic domain B is thereby broadened. In the constitution of this embodiment, since the tip faces 42c and 42d of the two ends 42a and 42b, respectively, of the yoke 42 are positioned relatively narrowly adjacent to each other, the Faraday rotator 20 could efficiently receive the magnetic field applied thereto and, therefore, a magnetic field of the intended intensity may be applied thereto even at a low current level. The magnetic domain wall I is on the +X side from the light input region 34 and moves in the area of the −X side from the light output region 35, and it does not exist in the light input region 34 and the light output region 35.

The polarization rotation angle that is formed when the light beam L shown in FIG. 2A and FIG. 2B passes through the Faraday rotator 20 after multiple reflection therein is proportional to the difference between the optical path length in the magnetic domain A formed by the +Z-direction magnetization and the optical path length in the magnetic domain B formed by the −Z-direction magnetization. Accordingly, when a variable magnetic field in the +Z direction is applied by the electromagnet to thereby move the magnetic domain wall I in the ±X direction, then the difference between the optical path length in the magnetic domain A and the optical path length in the magnetic domain B may be varied and the polarization rotation angle may be thereby variable. To that effect, the polarization plane of the light beam having entered the Faraday rotator 20 can be rotated by a desired angle before it goes out of the device.

In this embodiment, the Faraday rotator 20 has the ability of vertical magnetization. The magnetic garnet single-crystal film grown in a method of LPE generally has the ability of vertical magnetization to give a magnetic easy axis in the direction perpendicular to the growing face of the film owing to the growth-induced magnetic anisotropy thereof. Accordingly, the magnetization direction of the magnetic garnet single-crystal film is perpendicular to the growing face of the film. In order to rotate the direction of the magnetization of a Faraday rotator as in the magnetic field application method described in Patent Document 1, it is necessary that, after a magnetic garnet single-crystal film has been grown, it is heated at a high temperature of around 1000° C. or so for a long period of time so as to reduce the growth-induced magnetic anisotropy of the film. This produces a problem in that the process of producing the Faraday rotator is redundantly prolonged. In this embodiment of the invention, for example, when the magnetic easy axis is controlled to be the same as the magnetization direction in the magnetic domains A and B, then the production of the Faraday rotator 20 does not require such high-temperature long-period heat treatment. Therefore, in this embodiment, the process of producing the Faraday rotator 20 may be simplified, and easily-producible low-cost magneto-optic members can be realized.

In this embodiment, the magnetization rotation system of uniformly rotating the magnetization of a magneto-optical crystal as in Patent Document 1 is not employed but the magnetic domain wall movement system of moving the magnetic domain wall I to thereby vary the magnetic domain structure inside the Faraday rotator 20 is employed. Accordingly, the desired polarization rotation angle can be attained even by the use of a small-sized electromagnet. Therefore, the embodiment of the invention realizes small-sized and power-saving magneto-optical devices. In addition, since the response speed of magneto-optical devices is generally controlled by the factor L (inductance) of the electromagnet used therein, the factor L can be decreased if the electromagnet can be made small in size, so that the invention further realizes increased response speed of magneto-optical devices.

Further, in this embodiment, the yoke is so disposed that the two ends 42a and 42b thereof face each other via the Faraday rotator 20 sandwiched therebetween in the direction of the film thickness thereof. Accordingly, in this, the two ends 42a and 42b of the yoke can be disposed adjacent to each other, and the Faraday rotator 20 can therefore efficiently receive the variable magnetic field applied thereto. Therefore, the invention realizes more small-sized, power-saving magneto-optical devices.

In this embodiment, in addition, the Faraday rotator 20 all the time has the 2-domain structure, and it may vary the polarization rotation angle with good reproducibility with no hysteresis.

<Second Embodiment of the Invention>

Figures 3A, 3B:
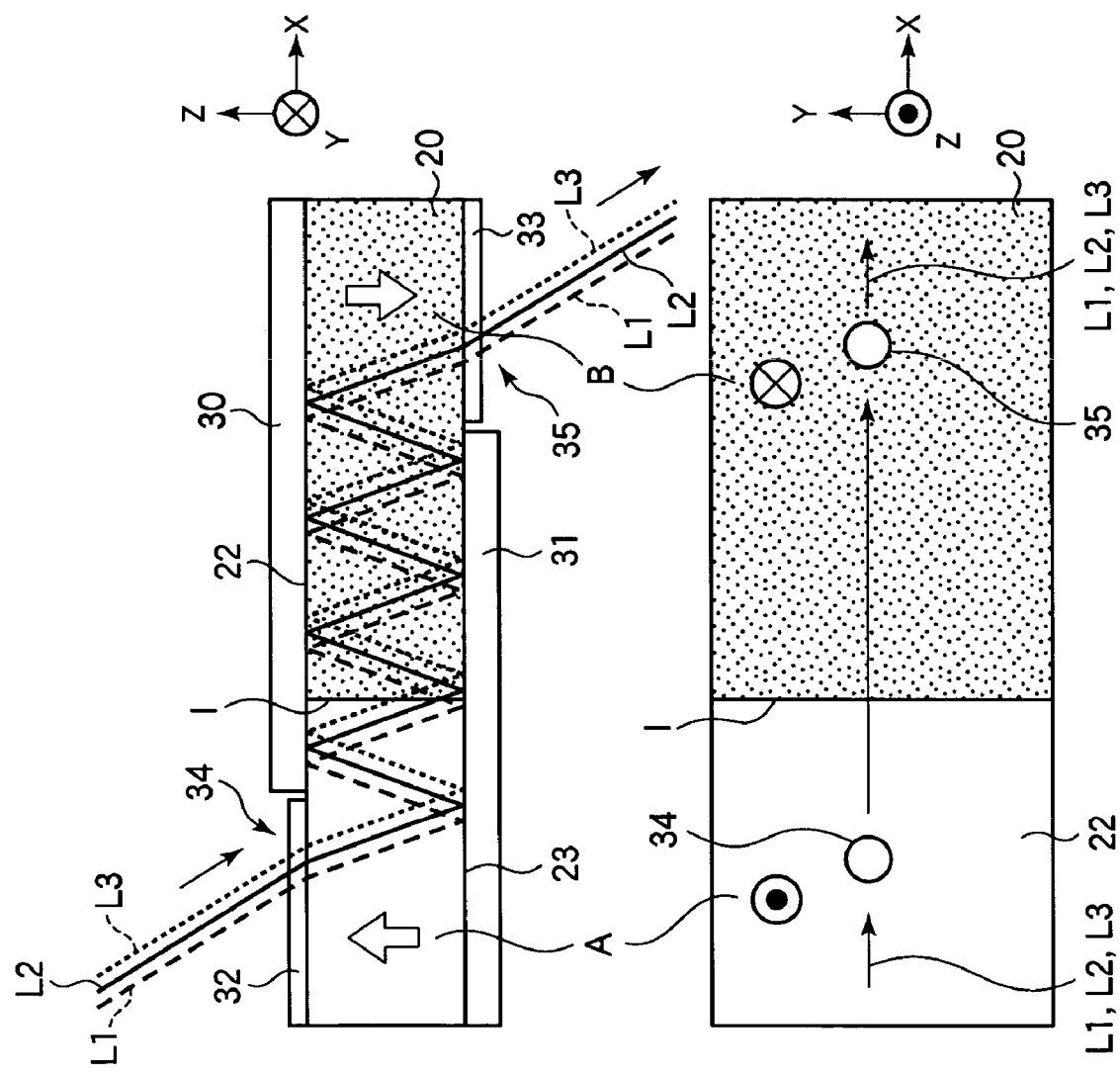
FIG. 3A and FIG. 3B are views showing the problems with the magneto-optical device of the first embodiment of the invention.

The magneto-optical device of the second embodiment of the invention is described hereinunder with reference to FIG. 3A to FIG. 18. The problem with the magneto-optical device 1 of the first embodiment is described below. Corresponding to FIG. 2A and FIG. 2B, respectively, FIG. 3A and FIG. 3B show the light path running inside the Faraday rotator 20 of the magneto-optical device 1. Different from FIG. 2A and FIG. 2B, however, the light beam diameter is taken into consideration in FIG. 3A and FIG. 3B. Concretely, FIG. 3A and FIG. 3B show a light path L2 (full line) on the center axis of nearly parallel light beams; a light path L1 (long-dot line) shifted toward the −X direction from the light path L2; and a light path L3 (short-dot line) shifted toward the +X direction from the light path L2. As in FIG. 3A and FIG. 3B, in the magneto-optical device 1 of the first embodiment of the invention, the light path length in the magnetic domain A and the light path length in the magnetic domain B differ between the light paths L1, L2 and L3. Concretely, the light path length of L1 is longer than that of L2 in the magnetic domain A, and is shorter than that of L2 in the magnetic domain B. The light path length of L3 is shorter than that of L2 in the magnetic domain A, and is longer than that of L2 in the magnetic domain B. When the light path length in the magnetic domain A differs from that in the magnetic domain B for every light path in the manner as above, then the polarization rotation angle may differ between different light paths. Accordingly, when the light having passed through the Faraday rotator 20 is collected at the light input end of the optical fiber for light output, then it produces diffraction loss.

Figure 4:
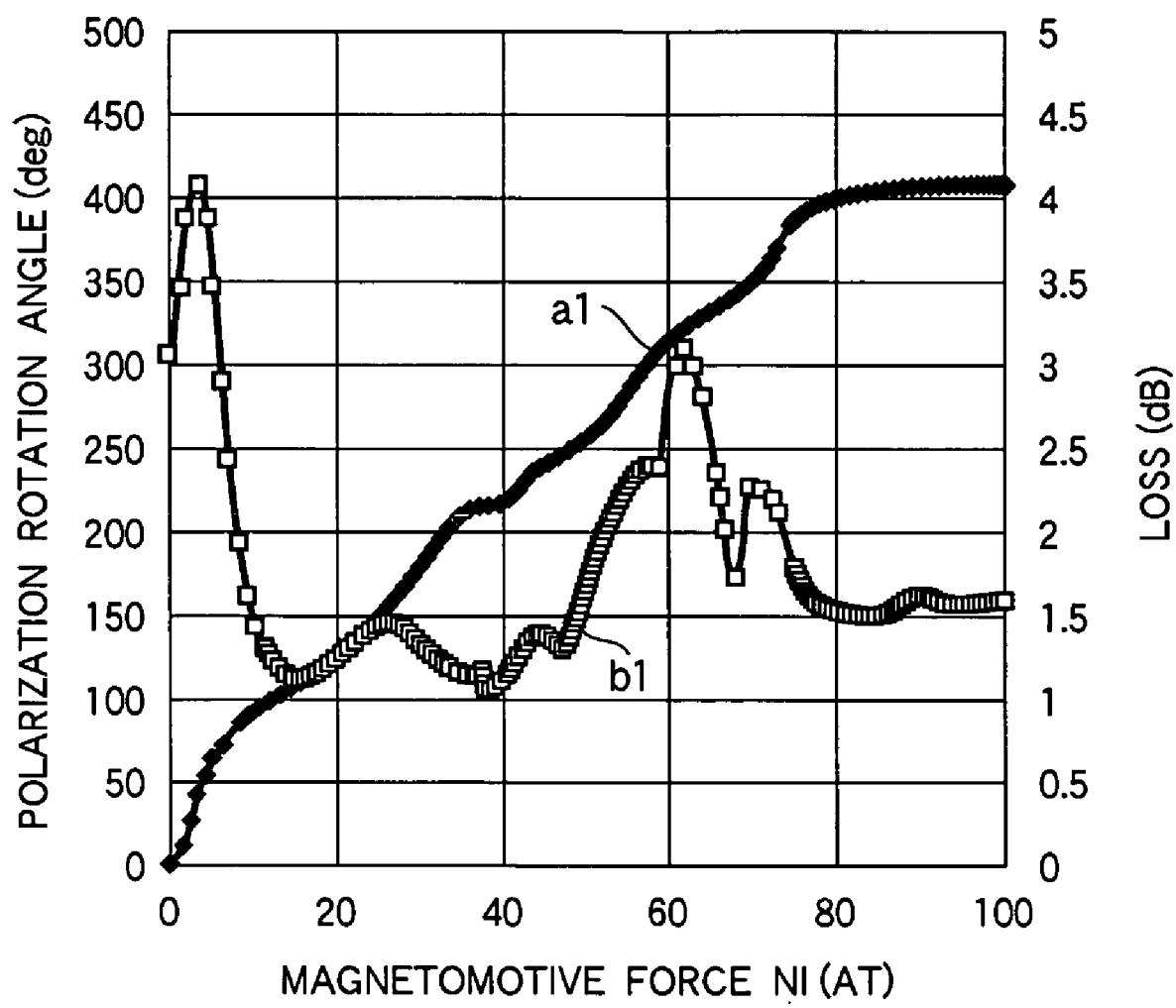
FIG. 4 is a graph showing the magnetomotive force dependency of the polarization rotation angle and the loss of the magneto-optical device of the first embodiment of the invention.

FIG. 4 is a graph showing the magnetomotive force dependency of the polarization rotation angle and the loss of the magneto-optical device 1 of the first embodiment of the invention. The horizontal axis indicates a magnetomotive force NI (the product of the number N of turns of the coil and the current I running through the coil) (AT); and the vertical axis indicates the polarization rotation angle (deg.) and the loss (dB). The line a1 shows the magnetomotive force dependency of the polarization rotation angle; and the line b1 shows the magnetomotive force dependency of the loss. In this, the polarization rotation angle is a relative value, for which the polarization rotation angle is 0 deg. when the magnetomotive force NI is 0 AT. As in FIG. 4, the magneto-optical device 1 may have a variable width of polarization rotation angle of at least 400 deg.; but the mean value of its loss (diffraction loss) is about 1.8 dB and is relatively high, and the fluctuation width of its loss is about 3.0 dB and is relatively large. Accordingly, the magneto-optical device 1 of the first embodiment of the invention may be applicable to optical modulators for modulating the quantity of light transmission, but has a problem in that it would not be applicable to polarization controllers that require a low degree of loss and a narrow loss fluctuation width.

Figure 5:
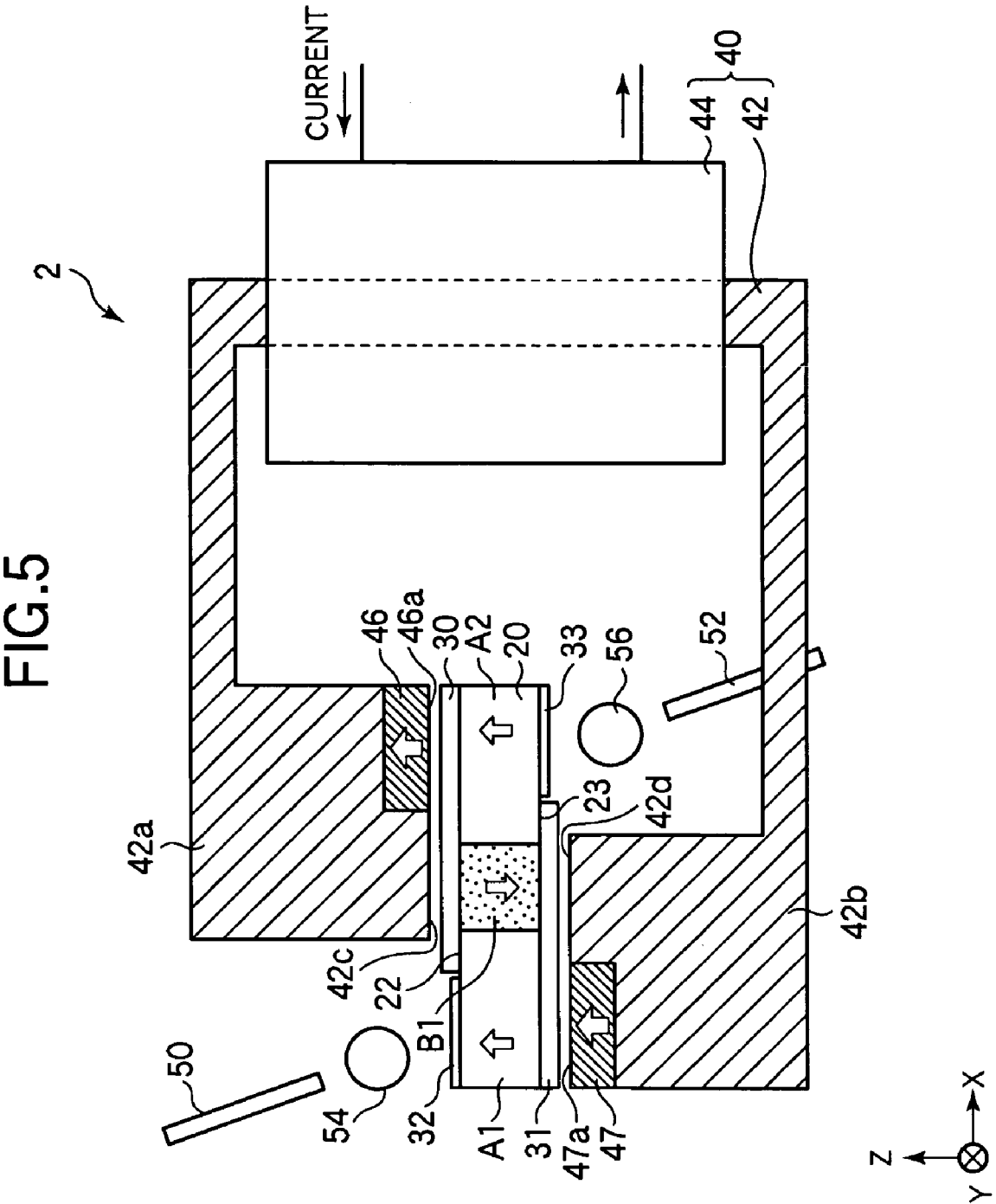
FIG. 5 is a view showing the outline of a magneto-optical device of the second embodiment of the invention.
Figure 6:
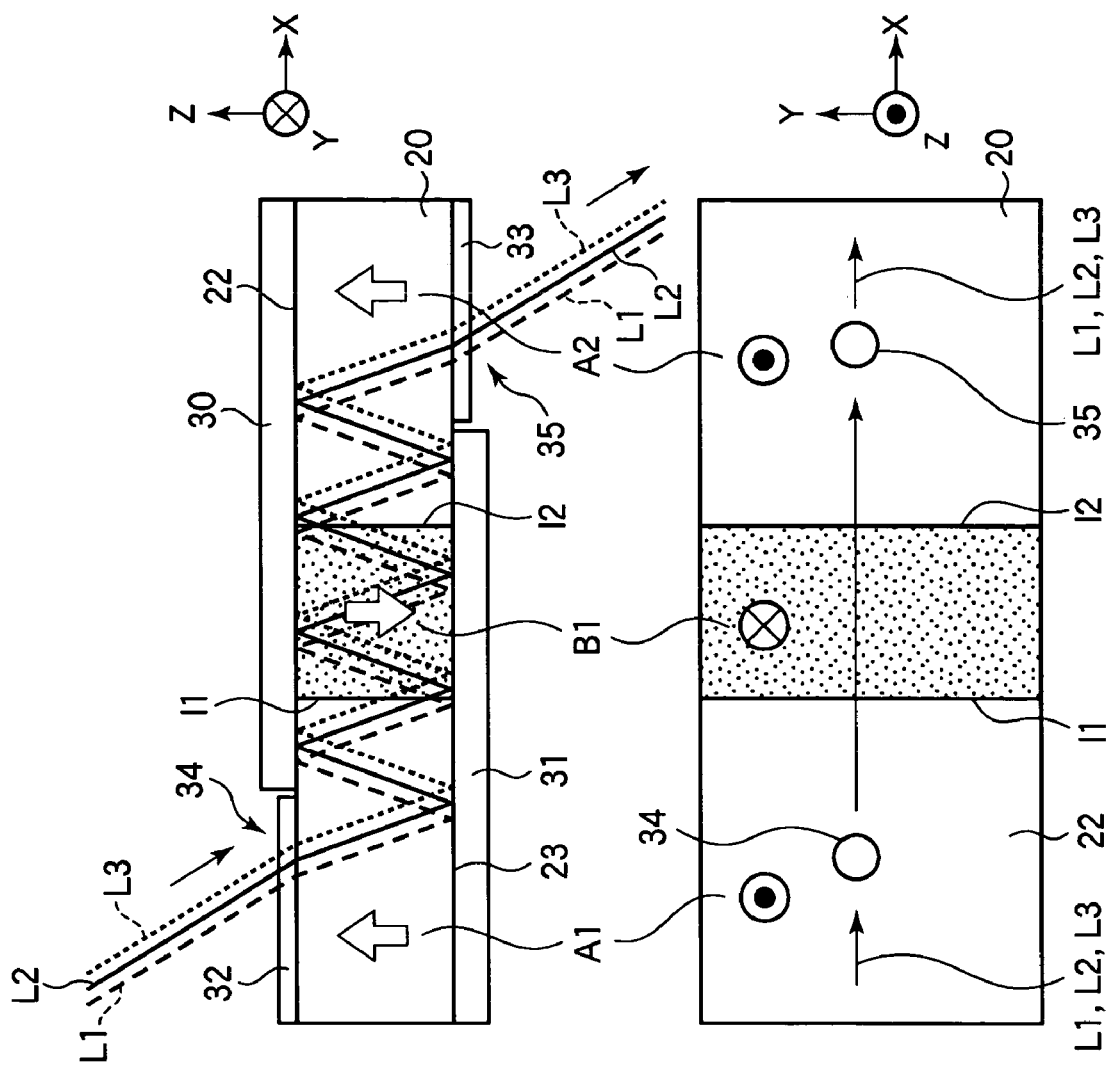
FIG. 6A and FIG. 6B are views showing the outline of an essential part of the magneto-optical device of the second embodiment of the invention.

FIG. 5 shows the outline of a polarization controller 2 as the magneto-optical device of this embodiment that solves the above-mentioned problem. FIG. 6A and FIG. 6B show the outline of an essential part of the polarization controller 2. The coordinates in FIG. 5 to FIG. 6B are the same as those in FIG. 1 to FIG. 2B. FIG. 6A shows the outline of an essential part of the polarization controller 2 seen in the +Y direction; and FIG. 6B shows the outline of the essential part thereof seen in the −Z direction. As in FIG. 5 to FIG. 6B, the polarization controller 2 has a Faraday rotator 20 of a magneto-optical crystal. The Faraday rotator 20 is formed of a magnetic garnet single-crystal film produced in a method of LPE, and has the ability of vertical magnetization to give a magnetic easy axis in the direction perpendicular to the growing face of the film (direction Z). The Faraday rotator 20 has a nearly rectangular parallelepiped form, and has surfaces 22 and 23 opposite to each other and both parallel to the X,Y planes. An anti-reflection film 32 (not shown in FIG. 6B) is formed in the vicinity of the light input region 34 of one surface 22 through which a light beam enters the structure. In the other part of the surface 22, formed is a total reflection film 30 (not shown in FIG. 6B). An anti-reflection film 33 is formed in the vicinity of the light output region 35 of the other surface 23 through which the light beam goes out of the structure. In the other part of the surface 23, formed is a total reflection film 31.

As in FIG. 5, the light having been outputted as divergent light from the single mode optical fiber 50 for light input is converted into parallel beams through the lens 54, and enters the light input region 34 of the Faraday rotator 20. The light thus having entered the Faraday rotator 20 runs inside the Faraday rotator 20 while being alternately reflected on the surfaces of the total reflection films 31 and 30, then goes out through the light output region 35, and is collected by the single mode optical fiber 52 for light output, via the lens 56. FIG. 6A and FIG. 6B show a light path L2 on the center axis of parallel light beams; a light path L1 shifted toward the −X direction from the light path L2; and a light path L3 shifted toward the +X direction from the light path L2.

The polarization controller 2 has an electromagnet 40 comprising a C-shaped yoke 42 and a coil 44 wound around the yoke 42. One end 42a of the yoke 42 is disposed adjacent to the back of the total reflection film 30 so that its tip may face the back of the total reflection film 30. A permanent magnet 46 is embedded partly in the tip of the end 42a (right side in FIG. 5). The tip face 42c of the end 42a and the surface 46a of the permanent magnet 46 are nearly in the same plane. The magnetization direction of the permanent magnet 46 is the +Z direction. The surface 46a that is nearly perpendicular to the magnetization direction of the permanent magnet 46 is so disposed that it does not face the end 42a of the yoke 42. The other end 42b of the yoke 42 is disposed in the vicinity of the back of the total reflection film 31 so that its tip may face the back of the total reflection film 31. A permanent magnet 47 is embedded partly in the tip of the end 42b (left side in FIG. 5). The tip face 42d of the end 42b and the surface 47a of the permanent magnet 47 are nearly in the same plane. The magnetization direction of the permanent magnet 47 is the +Z direction. The surface 47a that is nearly perpendicular to the magnetization direction of the permanent magnet 47 is so disposed that it does not face the end 42b of the yoke 42. The permanent magnets 46 and 47 may be in direct contact with the ends 42a and 42b, respectively, of the yoke 42, or may be disposed adjacent to the ends 42a and 42b via an adhesive layer or the like therebetween. The tip face 42c of the end 42a and the tip face 42d of the end 42b are so disposed that they face each other via the Faraday rotator 20 sandwiched therebetween.

Figure 7:
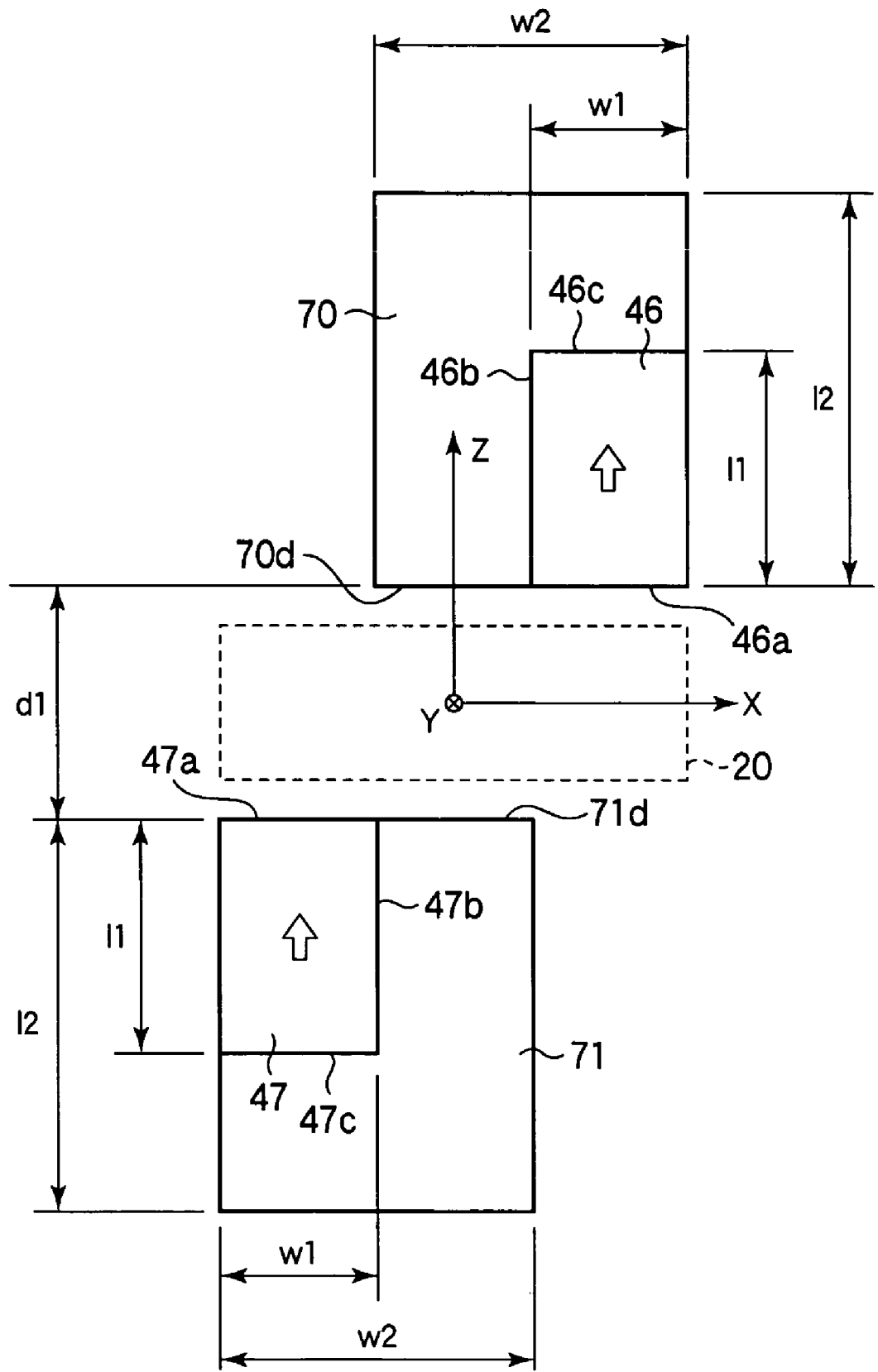
FIG. 7 is a view showing the disposition of a permanent magnet and a yoke.

The magnetic field to be produced by the permanent magnets 46 and 47 is described with reference to FIG. 7 and FIG. 8. FIG. 7 shows a structure having yokes 70 and 71 in place of the yoke 42, where the yoke 70 is disposed in the position corresponding to the end 42a of the yoke 42, and the yoke 71 is in the position corresponding to the end 42b of the yoke 42. Two surfaces 46b and 46c of the permanent magnet 46 are kept in contact with the yoke 70. The tip face 70d of the yoke 70 and the surface 46a of the permanent magnet 46 are nearly in the same plane. Two surfaces 47b and 47c of the permanent magnet 47 are kept in contact with the yoke 71. The tip face 71d of the yoke 71 and the surface 47a of the permanent magnet 47 are nearly in the same plane. In FIG. 7, the axis Y is taken in the direction in which the intersection of the plane that is parallel to the tip face 70d and to the surface 46a, and the surface 46b extends; and the axis X is taken in the direction that is perpendicular to the axis Y in the plane parallel to the tip face 70d and to the surface 46a. The axis Z is taken in the direction that is perpendicular to the tip face 70d and to the surface 46a. The origin is taken in the center of the line that connects the center of the tip face 70*d* to the center of the tip face 71*d*. The width w1 in the direction of the axis X of the permanent magnets 46 and 47 is 0.4 mm; the length l1 thereof in the direction of the axis Z is 0.6 mm; and the thickness thereof in the direction of the axis Y is 1.0 mm. The width w2 in the direction of the axis X of the yokes 70 and 71 is 0.8 mm; the length l2 thereof in the direction of the axis Z is 1.0 mm; and the thickness thereof in the direction of the axis Y is 1.0 mm. The distance d1 between the tip face 70*d* of the yoke 70 and the tip face 71*d* of the yoke 71 is 0.6 mm. When the residual magnetic flux density of the permanent magnets 46 and 47 is 9200 G (=0.92 T), the magnetic field distribution is calculated.

Figure 8:
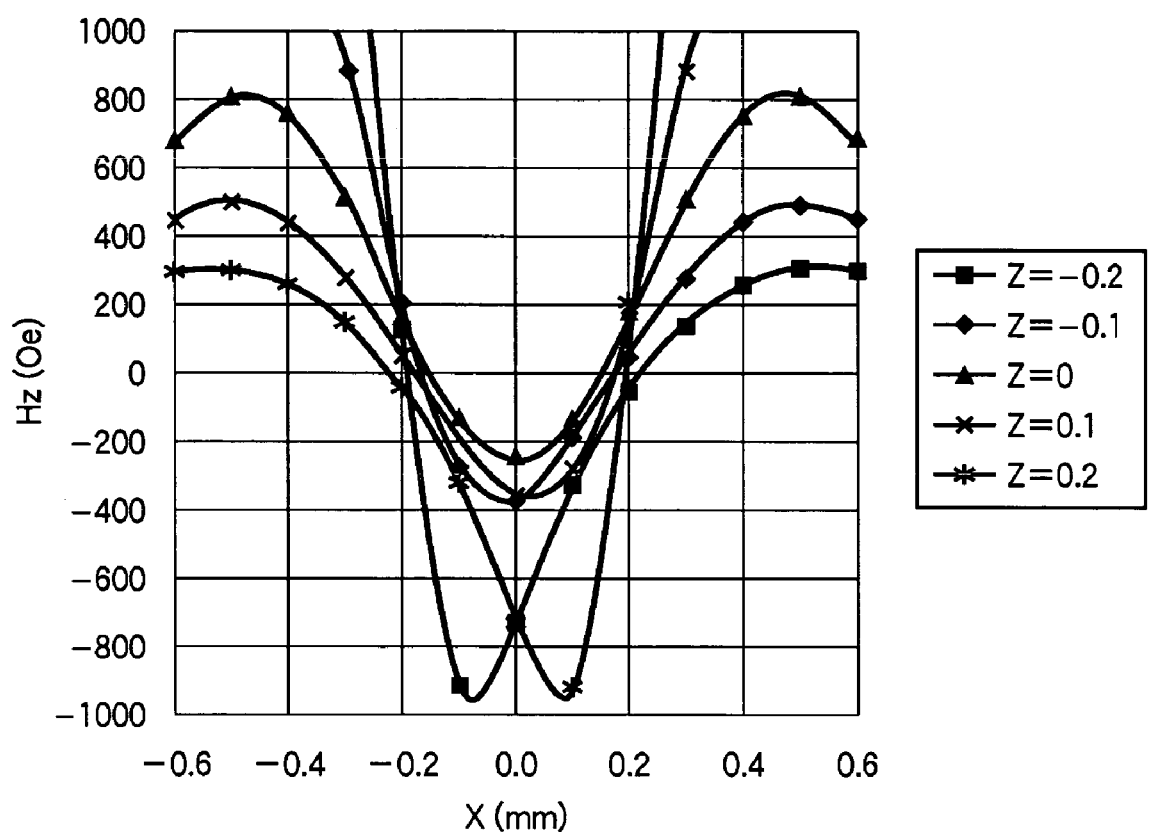
FIG. 8 is a graph showing the intensity of the magnetic field component in the vicinity of the permanent magnet in the disposition as in FIG. 7.

FIG. 8 is a graph showing the distribution of the magnetic field given by the permanent magnets 46 and 47. The horizontal axis indicates the position (mm) in the direction X; and the vertical axis indicates the magnetic field intensity Hz (Oe (1 Oe is nearly equal to 79.6 A/m)) in the direction Z. In this, the origin of the coordinates is taken in the center of the Faraday rotator 20 (shown by the dot line in FIG. 7) disposed to be nearly equally spaced from the permanent magnets 46 and 47; the right side direction in FIG. 7 is the +X direction and the upper direction in FIG. 7 is the +Z direction. As in FIG. 8, the magnetic field intensity Hz is nearly 0 (zero) in the plane that includes the surface 47*b* (X=−0.2) and in the plane that includes the surface 46*b* (X=0.2). On the side nearer to the permanent magnet 47 from the plane that includes the surface 47*b* (X<−0.2), the magnetic field occurs in the +Z direction; and on the side nearer to the permanent magnet 46 from the plane that includes the surface 46*b* (X>0.2), the magnetic field occurs in the +Z direction. Between the plane that includes the surface 47*b* and the plane that includes the surface 46*b* (−0.2<X<0.2), the magnetic field occurs in the −Z direction.

Now back to FIG. 5 to FIG. 6B, the region of the Faraday rotator 20 that faces the permanent magnet 47 is the magnetic domain A1 magnetized in the +Z direction. The region of the Faraday rotator 20 that faces the permanent magnet 46 is the magnetic domain A2 magnetized of the same direction as that of the magnetic domain A1. The region between the region of the magnetic domain A1 and the region of the magnetic domain A2 is the magnetic domain B1 magnetized (in the −Z direction) opposite to that for the magnetic domains A1 and A2. A magnetic domain wall I1 as a boundary interface is formed between the region of the magnetic domain A1 and the region of the magnetic domain B1; and a magnetic domain wall I2 is between the region of the magnetic domain A2 and the region of the magnetic domain B1. In this, the light input region 34 is inside the region of the magnetic domain A1; and the light output region 35 is inside the region of the magnetic domain A2. The magnetic field component in the −Z direction applied to the region of the magnetic domain B1 of the Faraday rotator 20 is the strongest in the intermediate part between the magnetic domain wall I1 and the magnetic domain wall I2 (the center part of the Faraday rotator 20), and becomes weaker toward the magnetic domain walls I1 and I2. On the magnetic domain walls I1 and I2, the Z-direction component of the applied magnetic field is 0 (zero).

When a current is made to run through the coil 44 of the electromagnet 40, then a closed magnetic circuit that runs through the yoke 42 and the Faraday rotator 20 is formed, and, for example, a +Z-direction magnetic field is applied to the Faraday rotator 20 in and around the region sandwiched between the two tip faces 42*c* and 42*d* of the yoke 42. Accordingly, the boundary region where the Z-direction component of the applied magnetic field becomes 0 (zero) moves toward the center part of the Faraday rotator 20. In other words, the two magnetic domain walls I1 and I2 move to be nearer to each other, and the width of the magnetic domain B1 region becomes narrower in accordance with the intensity of the applied magnetic field. On the other hand, when an opposite current is made to run through the coil 44 of the electromagnet 40, then a −Z-direction magnetic field is applied to the Faraday rotator 20 in and around the region sandwiched between the two tip faces 42*c* and 42*d* of the yoke 42. Accordingly, the boundary region where the Z-direction component of the applied magnetic field becomes 0 (zero) moves remoter from the center part of the Faraday rotator 20. In other words, the two magnetic domain walls I1 and I2 move to be remoter from each other, and the width of the magnetic domain B1 region becomes broader in accordance with the intensity of the applied magnetic field. In the constitution of this embodiment, the two tip faces 42*c* and 42*d* of the yoke are disposed relatively in the vicinity of each other, and therefore a magnetic field of the intended intensity may be applied thereto even at a low current level. The magnetic domain walls I1 and I2 are on the +X side from the light input region 34 and move in the area of the −X side from the light output region 35, and they do not exist in the light input region 34 and the light output region 35.

The polarization rotation angle that is formed when light passes through the Faraday rotator 20 is proportional to the difference between the optical path length in the magnetic domain A (A1, A2) formed by the +Z-direction magnetization and the optical path length in the magnetic domain B (B1) formed by the −Z-direction magnetization. Accordingly, when a variable magnetic field in the +Z direction is applied by the electromagnet 40 while the light input region 34 is kept positioned in the magnetic domain A1 and the light output region 35 is in the magnetic domain A2, to thereby move the magnetic domain walls I1 and I2 so as to narrow the width of the magnetic domain B1, or when a variable magnetic field in the −Z direction is applied by the electromagnet 40 to thereby move the magnetic domain walls I1 and I2 so as to broaden the width of the magnetic domain B1, then the difference between the optical path length in the magnetic domain A and the optical path length in the magnetic domain B may be varied and the polarization rotation angle may be thereby variable. To that effect, the polarization plane of the light beam having entered the Faraday rotator 20 can be rotated by a desired angle before it goes out of the device.

In this embodiment as described hereinabove, the light input region 34 and the light output region 35 are disposed in the magnetic domains A1 and A2, respectively, magnetized in the same direction. As in FIG. 6A, for example, the length of the light path L1 in the magnetic domain A1 is longer than that of the light path L2 therein, but is thereby shorter in the magnetic domain A2 than that of the light path L2. The length of the light path L3 is shorter in the magnetic domain A1 than that of the light path L2, but is thereby longer in the magnetic domain A2 than that of the light path L2. The light path length in the magnetic domain B1 is constant irrespective of the light paths L1, L2 and L3. Accordingly, the difference between the light path length in the magnetic domains A1 and A2 and that in the magnetic domain B1 is the same in all the light paths of the parallel light beams. Therefore, since the polarization rotation angle is the same irrespective of the light paths, there occurs no diffraction loss when the light having passed through the Faraday rotator 20 is collected by the single mode optical fiber 52 for light output. As a result, the magneto-optic structure of this embodiment is applicable to the polarization controller 2 that requires a low degree of loss and a narrow loss fluctuation width. In addition, in the structure of this embodiment, since the light having entered the Faraday rotator 20 undergoes multiple reflection and since the length of the light path in the Faraday rotator 20 is therefore long, a large polarization rotation angle can be obtained even when the Faraday rotator 20 is thin, and the polarization rotation angle ensures a broad variable range. Accordingly, there is no need of using a multiple Faraday rotators 20, and the invention realizes the polarization controller 2 having the advantage of small size, low cost and power-saving capability.

In the magneto-optical device of this embodiment, used is the Faraday rotator 20 having the ability of vertical magnetization. Accordingly, when the Faraday rotator 20 is formed of a magnetic garnet single-crystal film grown in a method of LPE, it does not require high-temperature long-period heat treatment. Therefore, in this embodiment, the process of producing the Faraday rotator 20 may be simplified, and easily-producible low-cost magneto-optic members can be realized.

In this embodiment, the magnetic domain structure in the Faraday rotator 20 is varied. Therefore, like the first embodiment of the invention mentioned above, this embodiment also realizes small-sized, power-saving and high-performance magneto-optical devices. Further, in this embodiment, the yoke 42 is so disposed that the two ends 42a and 42b thereof are adjacent to the total reflection films 30 and 31, respectively, and the Faraday rotator 20 can therefore efficiently receive the variable magnetic field applied thereto. Accordingly, the invention realizes more small-sized, power-saving magneto-optical devices. In this embodiment, in addition, the Faraday rotator 20 all the time has the 3-domain structure, and it may vary the polarization rotation angle with good reproducibility with no hysteresis.

The magneto-optical device of this embodiment is described concretely with reference to the following embodiment.

Figure 9:
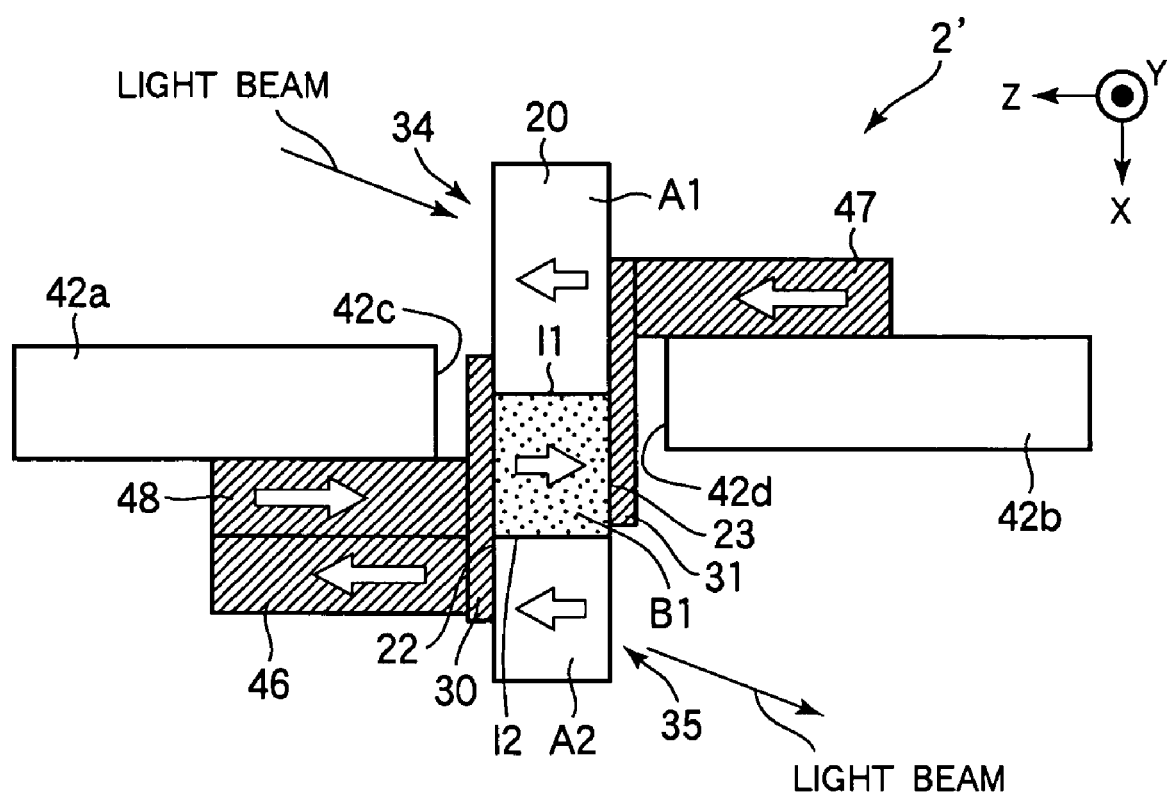
FIG. 9 is a view showing the outline of an essential part of the magneto-optical device of Embodiment 2-1 of the second embodiment of the invention.

Embodiment 2-1:

A magneto-optical device of the Embodiment 2-1 is described. FIG. 9 shows the outline of an essential part of a polarization controller 2' of this embodiment. FIG. 9 has the same coordinates as in FIG. 1 to FIG. 2B. As in FIG. 9, the polarization controller 2' has an electromagnet that comprises the yoke 42 (only its end 42a and 42b are shown in FIG. 9), and the coil wound around the yoke 42. The yoke 42 is so disposed that its one end 42a is disposed adjacent to the back of the total reflection film 30 so that the tip face 42c of the end 42a faces the back of the total reflection film 30. The other end 42b of the yoke 42 is disposed adjacent to the back of the total reflection film 31 so that the tip face 42d of the end 42b faces the back of the total reflection film 31. The tip face 42c of the end 42a faces the tip face 42d of the end 42b via the Faraday rotator 20 sandwiched therebetween.

A permanent magnet 48 is disposed in the +X direction, adjacent to one end 42a of the yoke 42. The magnetization direction of the permanent magnet 48 is the −Z direction. A permanent magnet 46 is disposed in the +X direction, adjacent to the permanent magnet 48. The magnetization direction of the permanent magnet 46 is the +Z direction. The −Z-side tip of the permanent magnets 46 and 48 is, for example, kept in contact with the back of the total reflection film 30. A permanent magnet 47 is disposed in the −X direction, adjacent to the other end 42b. The magnetization direction of the permanent magnet 47 is the +Z direction. The +Z-side tip of the permanent magnet 47 is, for example, kept in contact with the back of the total reflection film 31.

In the −X-side region of the Faraday rotator 20, the permanent magnet 47 gives a +Z-direction magnetic field component that is stronger than the saturation magnetic field. Therefore, this region is a magnetic domain A1 formed by the +Z-direction magnetization. In the +X-side region of the Faraday rotator 20, the permanent magnet 46 gives a +Z-direction magnetic field component that is stronger than the saturation magnetic field. Therefore, this region is a magnetic domain A2 magnetized in the same direction as that for the magnetic domain A1. In the region between the magnetic domain A1 and the magnetic domain A2, the permanent magnet 48 gives a −Z-direction magnetic field component that is stronger than the saturation magnetic field. Therefore, this region is a magnetic domain B1 magnetized opposite to that for the magnetic domains A1 and A2. A magnetic domain wall I1 is formed between the region of the magnetic domain A1 and the region of the magnetic domain B1, and a magnetic domain wall I2 is between the region of the magnetic domain A2 and the region of the magnetic domain B1. In that manner, the Faraday rotator 20 has a 3-domain structure, and one of the permanent magnets 46, 47 and 48 is disposed correspondingly to every magnetic domain. The light input region 34 is positioned in the region of the magnetic domain A1, and the light output region 35 is in the region of the magnetic domain A2.

Figure 10:
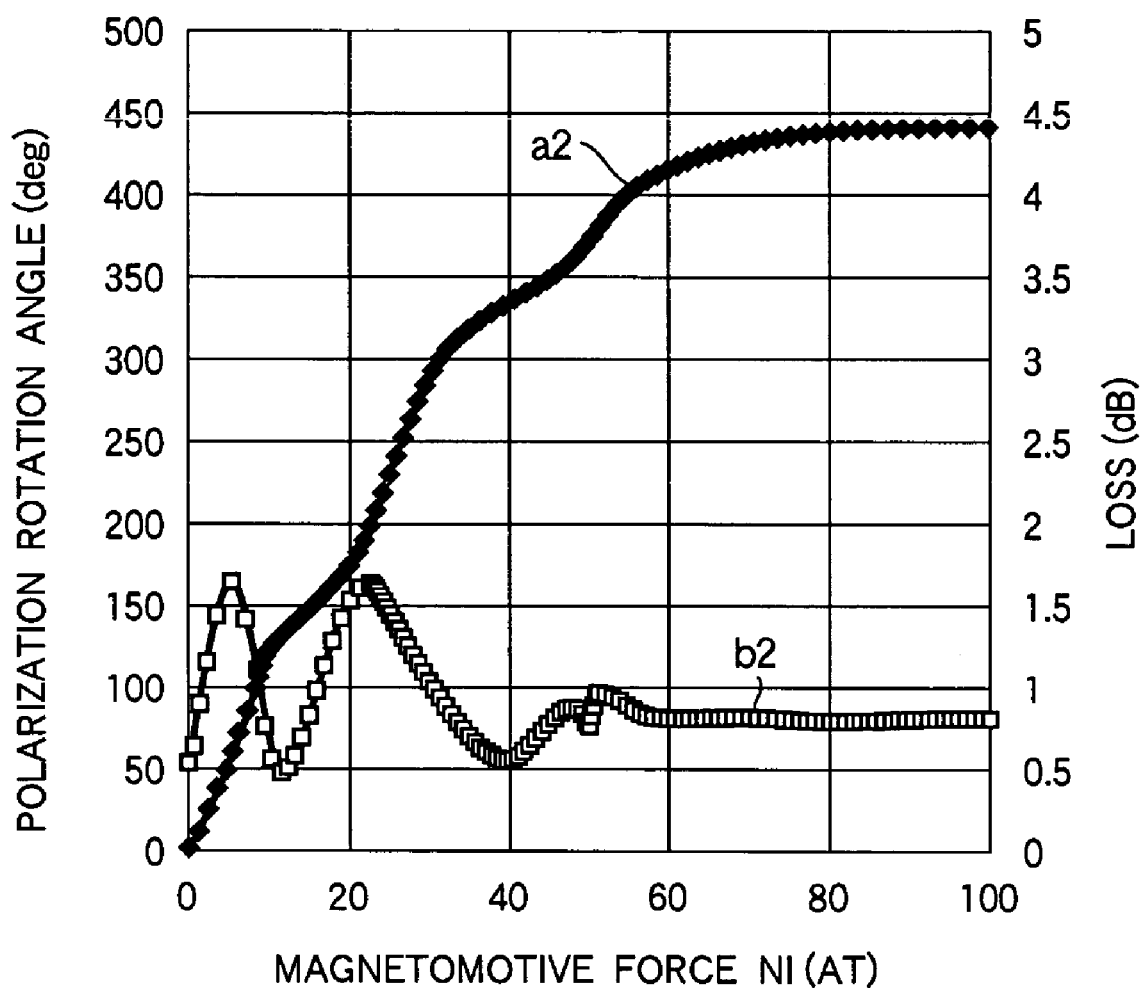
FIG. 10 is a graph showing the magnetomotive force dependency of the polarization rotation angle and the loss of the magneto-optical device of Embodiment 2-1 of the second embodiment of the invention.

FIG. 10 is a graph showing the magnetomotive force dependency of the polarization rotation angle and the loss of the polarization controller 2' of this Embodiment. In this, the horizontal axis and the vertical axis are the same as those of the graph of FIG. 4. The line a2 shows the magnetomotive force dependency of the polarization rotation angle; and the line b2 shows the magnetomotive force dependency of the loss. As in FIG. 10, the mean value of the loss of the polarization controller 2' of this Embodiment is about 1.0 dB, and the loss fluctuation width is 1.2 dB or so. When compared with the magnetomotive force dependency of the loss of the magneto-optical device having a 2-domain structure shown in FIG. 4, the loss of the polarization controller 2' is low and the loss fluctuation thereof is small. Accordingly, it is understood that this Embodiment is applicable to polarization controllers that require a low degree of loss and a narrow loss fluctuation width.

Figure 11:
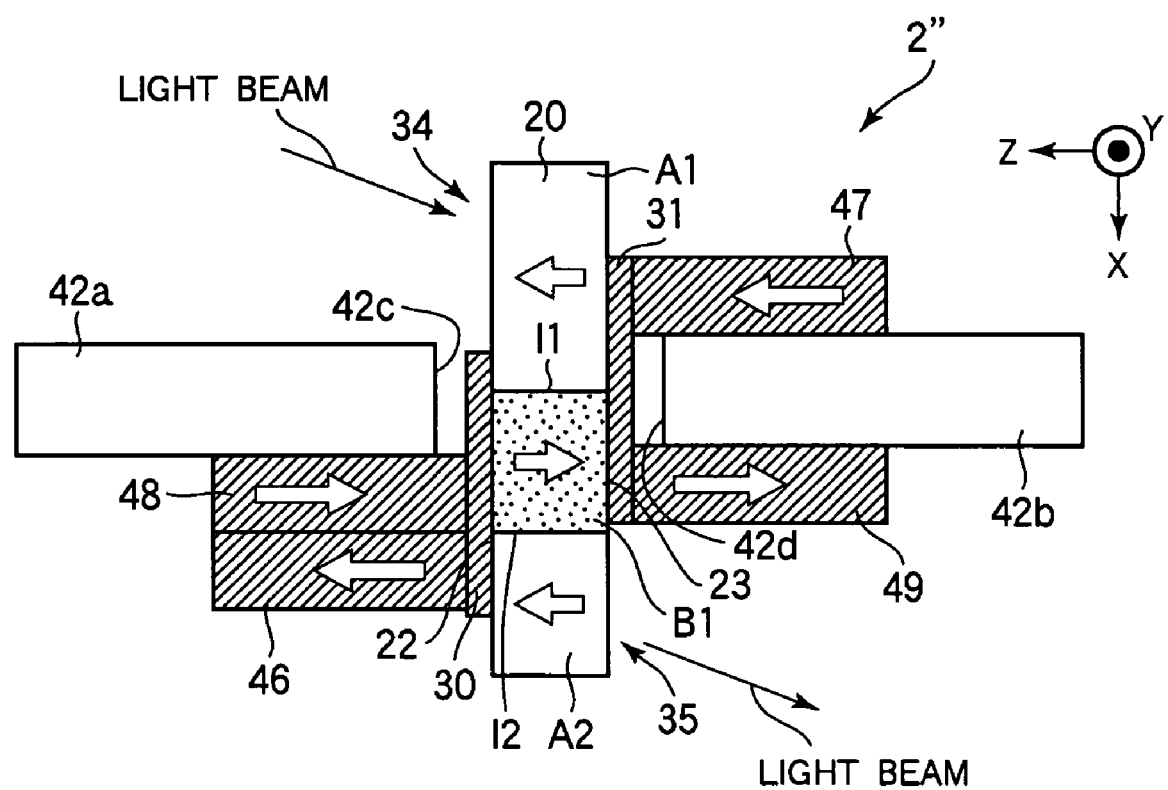
FIG. 11 is a view showing the outline of an essential part of the magneto-optical device of Embodiment 2-2 of the second embodiment of the invention.

Embodiment 2-2:

A magneto-optical device of Embodiment 2-2 of this embodiment is described. FIG. 11 shows the outline of an essential part of a polarization controller 2" of this embodiment. FIG. 11 has the same coordinates as in FIG. 1 to FIG. 2B. As in FIG. 11, the polarization controller 2" has a permanent magnet 49 positioned adjacent to the end 42b of the yoke 42 in the +X direction thereof, in addition to the same constitution as in the polarization controller 2' shown in FIG. 9. The magnetization direction of the permanent magnet 49 is the −Z direction. The Faraday rotator 20 has a three-domain structure comprising the magnetic domains A1, B1 and A2. In this Embodiment, one permanent magnet 46 or 47 is disposed correspondingly to the magnetic domains A1 and A2, respectively; and two permanent magnets 48 and 49 are disposed correspondingly to the magnetic domain B1. The light input region 34 is positioned in the region of the magnetic domain A1; and the light output region 35 is in the region of the magnetic domain A2.

Figure 12:
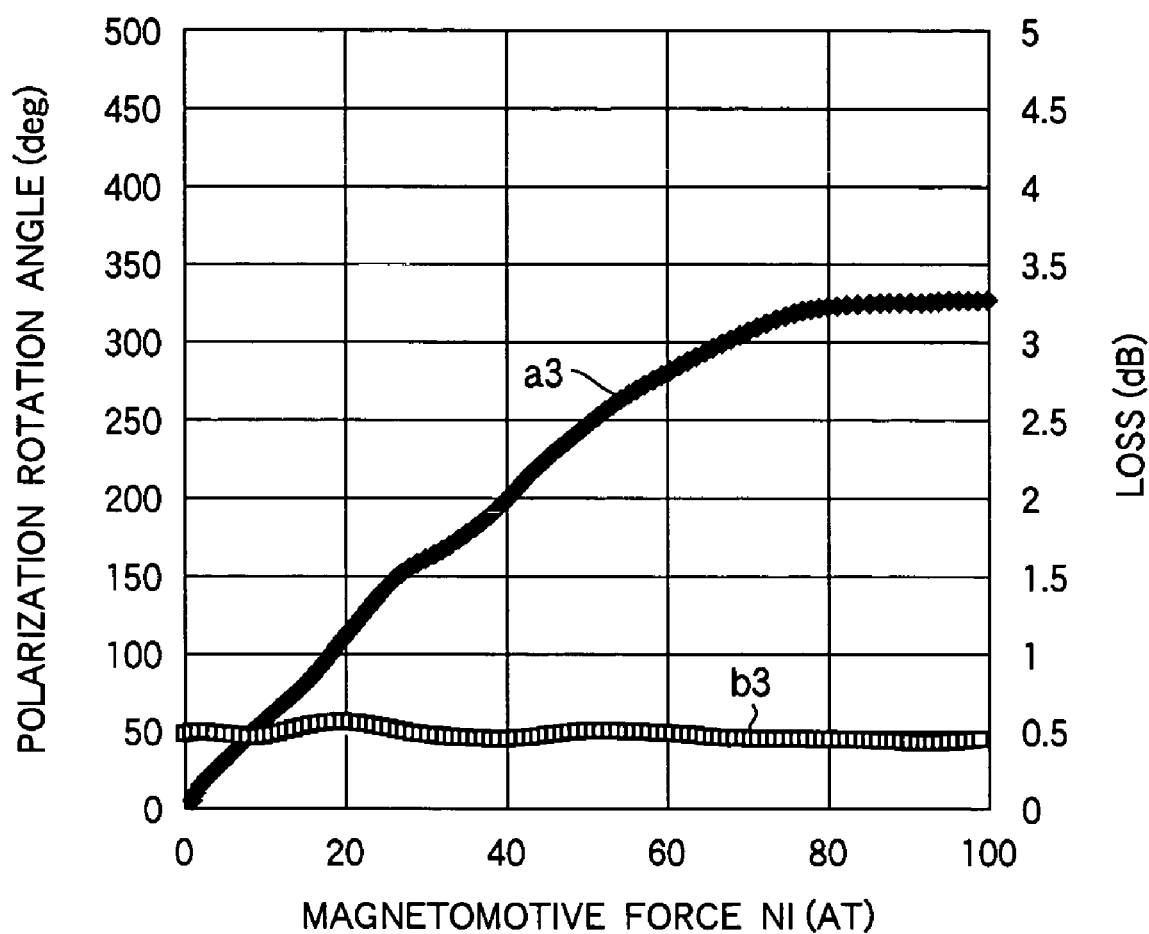
FIG. 12 is a graph showing the magnetomotive force dependency of the polarization rotation angle and the loss of the magneto-optical device of Embodiment 2-2 of the second embodiment of the invention.

FIG. 12 is a graph showing the magnetomotive force dependency of the polarization rotation angle and the loss of the polarization controller 2" of this embodiment. In this, the horizontal axis and the vertical axis are the same as those of the graph of FIG. 4. The line a3 shows the magnetomotive force dependency of the polarization rotation angle; and the line b3 shows the magnetomotive force dependency of the loss. As in FIG. 12, the mean value of the loss of the polarization controller 2" of this embodiment is about 0.5 dB, and the loss fluctuation width is 0.16 dB or so. When compared with the magnetomotive force dependency of the loss of the polarization controller 2' shown in FIG. 10, the loss of the polarization controller 2" is further lower and the loss fluctuation thereof is further smaller. Accordingly, it is understood that this embodiment is applicable to polarization controllers that require a low degree of loss and a narrow loss fluctuation width.

Figure 13:
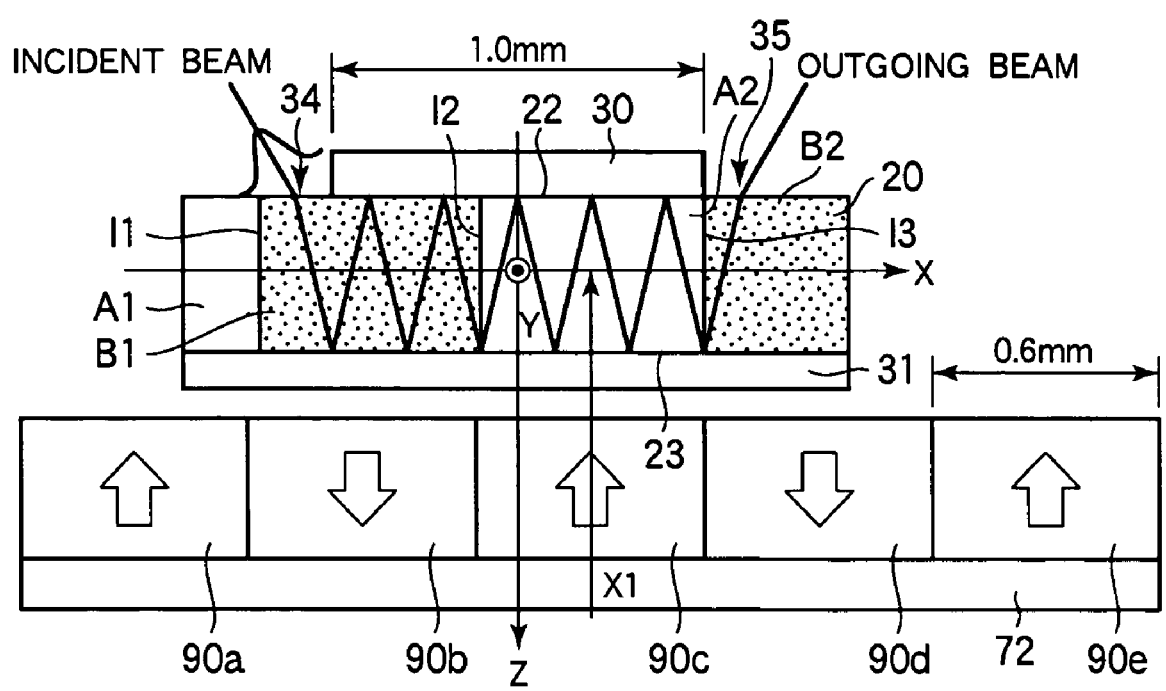
FIG. 13 is a view for explaining the magnetic domain structure dependency of the insertion loss of a magneto-optical device.

The magnetic domain structure dependency of the insertion loss of magneto-optical devices is described. FIG. 13 shows the outline of a magneto-optical device where a 3-domain structure is formed in the Faraday rotator therein. As in FIG. 13, the Faraday rotator 20 has the light input region 34 and the light output region 35 both disposed on the side of the surface 22 thereof, like in the third embodiment of the invention described hereinunder. The length in the ±X direction of the Faraday rotator 20 is 2 mm; the width in the ±Y direction thereof is 0.8 mm; and the thickness in the ±Z direction thereof is 0.42 mm. The length in the ±X direction of the total reflection film 30 is 1.0 mm.

Multiple permanent magnets (five in FIG. 13) 90a to 90e that are aligned in the ±X direction are disposed in the +Z direction of the Faraday rotator 20. The length in the ±X direction of each permanent magnet 90a to 90e is 0.6 mm; the width in the ±Y direction thereof is 0.8 mm; and the thickness in the ±Z direction thereof is 1.0 mm. The permanent magnets 90a to 90e are all kept in contact with the yoke 72 that is disposed in the +Z direction thereof. The magnetization direction of the permanent magnets 90a, 90c and 90e is the −Z direction; and the magnetization direction of the permanent magnets 90b and 90d is the +Z direction. The permanent magnets 90a to 90e form a predetermined magnetic domain structure in the Faraday rotator 20. In the condition of FIG. 13, magnetic domains A1, B1, A2 and B2 are formed in that order from the −X side. The light input region 34 is positioned in the region of the magnetic domain B1; and the light output region 35 is in the region of the magnetic domain B2. A magnetic domain wall I1 is formed between the magnetic domain A1 and the magnetic domain B1; a magnetic domain wall I2 is between the magnetic domain B1 and the magnetic domain A2; and a magnetic domain wall I3 is between the magnetic domain A2 and the magnetic domain B2. The magnetic domain walls I1 to I3 are nearly parallel to the Y,Z planes. In that manner, the Faraday rotator 20 has a 4-domain structure, and the area including the light input region 34 and the light output region 35 for light beam transmission therethrough has a 3-domain structure that comprises the magnetic domains B1, A2 and B2. Accordingly, the Faraday rotator 20 has the substantially 3-domain structure formed therein.

Figure 14:
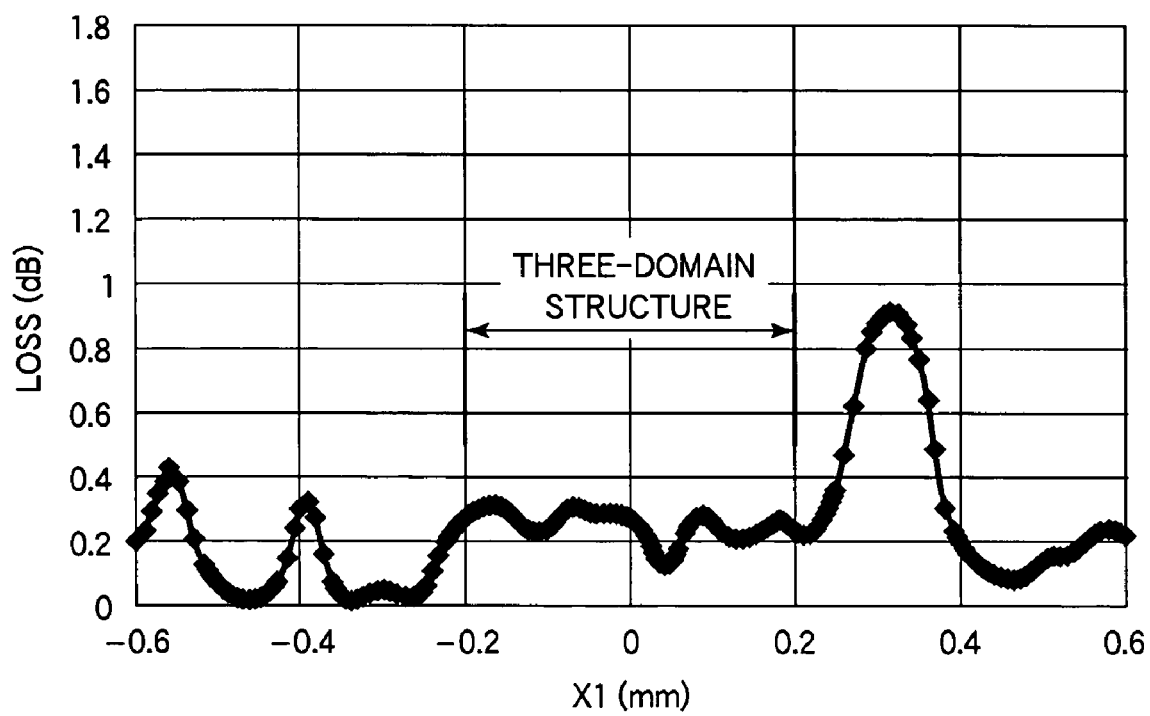
FIG. 14 is a graph showing the magnetic domain structure dependency of the insertion loss of a magneto-optical device.

While the permanent magnets 90a to 90e and the yoke 72 are moved in the ±X direction relative to the Faraday rotator 20 so as to vary the magnetic domain structure formed in the Faraday rotator 20, the insertion loss of the magneto-optical device is measured. FIG. 14 is a graph showing the magnetic domain structure dependency of the insertion loss of the magneto-optical device shown in FIG. 13. The horizontal axis indicates an X-coordinate, X1 (mm) at the center position of the permanent magnet 90c; and the vertical axis indicates the loss (dB) thereof. The origin of the coordinates is taken at the center position of the Faraday rotator 20, and the wavelength for measurement is 1550 nm. As in FIG. 14, within the range of the X-coordinate X1 to form the 3-domain structure between the light input region 34 and the light output region 35 of the Faraday rotator 20 (−0.2 mm to 0.2 mm), the mean value of the insertion loss is about 0.25 dB and is relatively low, and the insertion loss fluctuation width is about 0.19 dB and is relatively small. However, when the X-coordinate X1 is 0.3 mm or so, then the magnetic domain wall I1 crosses the light input region 34 and the magnetic domain wall I3 crosses the light output region 35, and, as a result, the loss greatly fluctuates to at most 0.9 dB or so.

Figure 15:
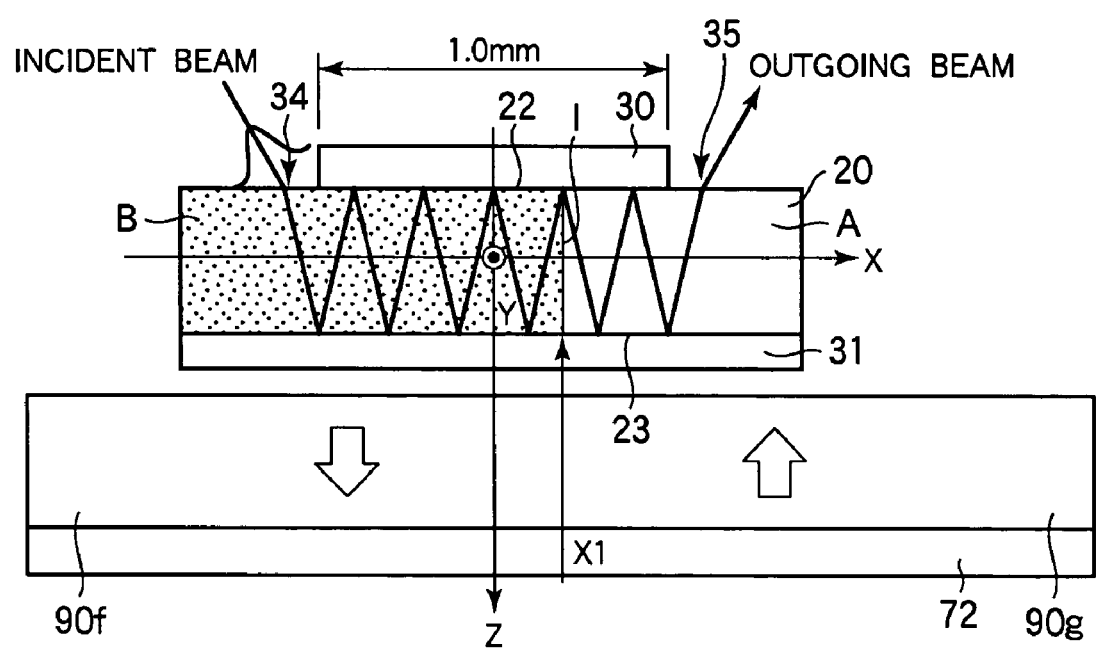
FIG. 15 is a view for explaining the magnetic domain structure dependency of the insertion loss of a magneto-optical device.

FIG. 15 shows the outline of a magneto-optical device where a 2-domain structure is formed in the Faraday rotator 20 therein. In the embodiment of shown in FIG. 15, two permanent magnets 90f and 90g that are adjacent to each other in the ±X direction are disposed, in place of the permanent magnets 90a to 90e in FIG. 13. The length in the ±X direction of the permanent magnets 90f and 90g is 3 mm; the width in the ±Y direction thereof is 3 mm; and the thickness in the ±Z direction thereof is 2.0 mm. The magnetization direction of the permanent magnet 90f is the +Z direction; and the magnetization direction of the permanent magnet 90g is the −Z direction. The permanent magnets 90f and 90g form a 2-domain structure in the Faraday rotator 20, which comprises the magnetic domain B on the −X side, the magnetic domain A on the +X side and the magnetic domain wall I serving as a boundary between the two magnetic domains A and B.

Figure 16:
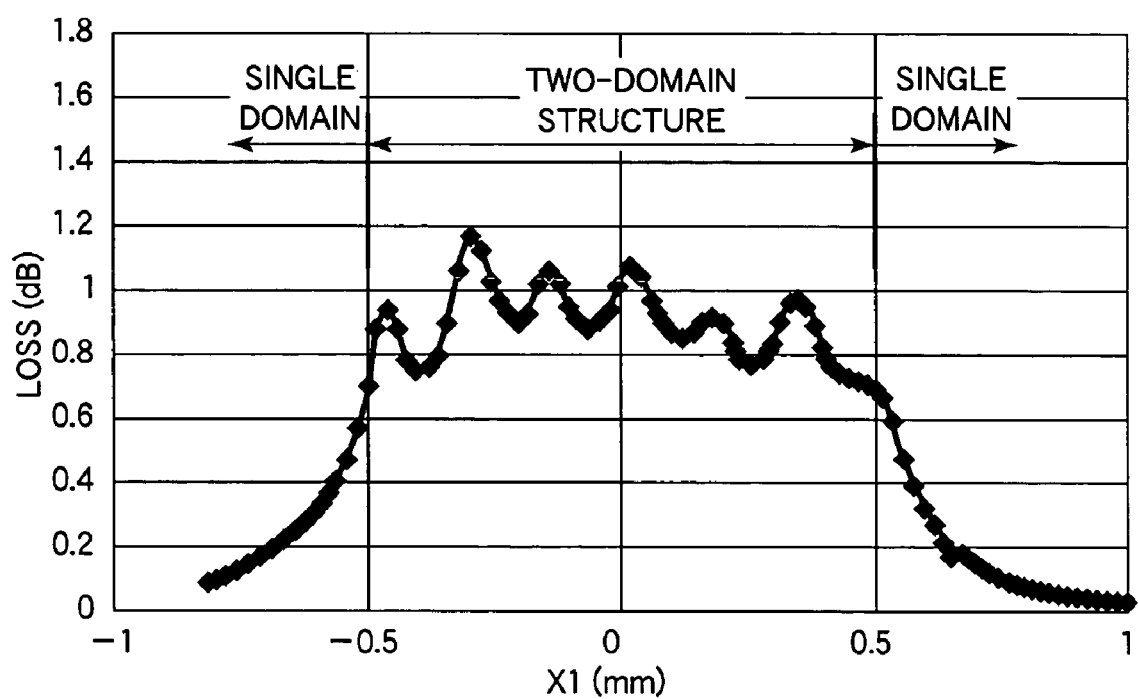
FIG. 16 is a graph showing the magnetic domain structure dependency of the insertion loss of a magneto-optical device.

While the permanent magnets 90f and 90g and the yoke 72 are moved in the ±X direction relative to the Faraday rotator 20 so as to vary the magnetic domain structure formed in the Faraday rotator 20, the insertion loss of the magneto-optical device is measured. FIG. 16 is a graph showing the magnetic domain structure dependency of the insertion loss of the magneto-optical device shown in FIG. 15. The horizontal axis indicates an X-coordinate, X1 (mm) at the boundary interface of the permanent magnets 90f and 90g; and the vertical axis indicates the loss (dB) thereof. The wavelength for measurement is 1550 nm. As in FIG. 16, within the range of the X-coordinate X1 where the magnetic domain wall I is positioned between the light input region 34 and the light output region 35 and a 2-domain structure is formed in the Faraday rotator 20 (−0.5<X1<0.5), the mean value of the insertion loss is about 0.90 dB and is relatively high, but the insertion loss fluctuation width is about 0.48 dB and is relatively small. When the magnetic domain wall I crosses the light input region 34 or the light output region 35 (X1=−0.5, 0.5), the insertion loss greatly fluctuates. Within the range of the X-coordinate X1 where the wall magnetic domain I does not exist between the light input region 34 and the light output region 35 and the Faraday rotator 20 therefore forms a substantially single-domain structure, not causing any change in the Faraday rotation angle (X<−0.5, X>0.5), the mean value of the insertion loss is low.

Figure 17:
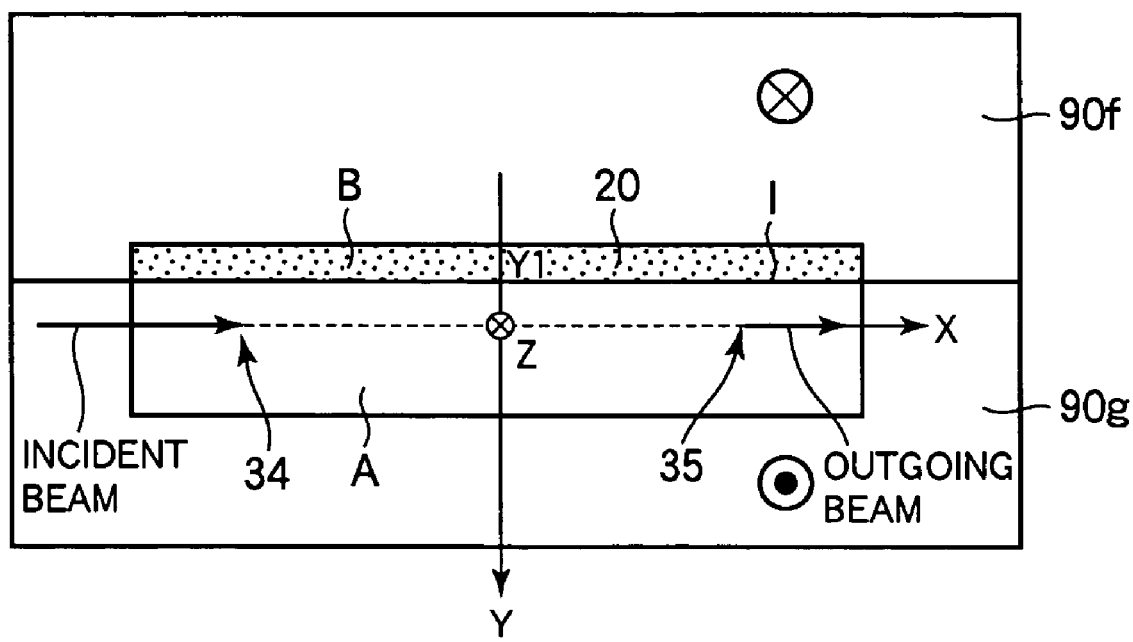
FIG. 17 is a view for explaining the magnetic domain structure dependency of the insertion loss of a magneto-optical device.

FIG. 17 shows the outline of another magneto-optical device where a 2-domain structure is formed in the Faraday rotator 20 therein. In FIG. 17, the magneto-optical device is seen in the +Z direction thereof. In FIG. 17, the two permanent magnets 90f and 90g are disposed adjacent to each other in the ±Y direction, different from those in the embodiment of FIG. 15. The permanent magnets 90f and 90g form a 2-domain structure in the Faraday rotator 20, which comprises the magnetic domain B on the −Y side, the magnetic domain A on the +Y side and the magnetic domain wall I serving as a boundary between the two magnetic domains A and B. The magnetic domain wall I is nearly parallel to the X,Z planes.

Figure 18:
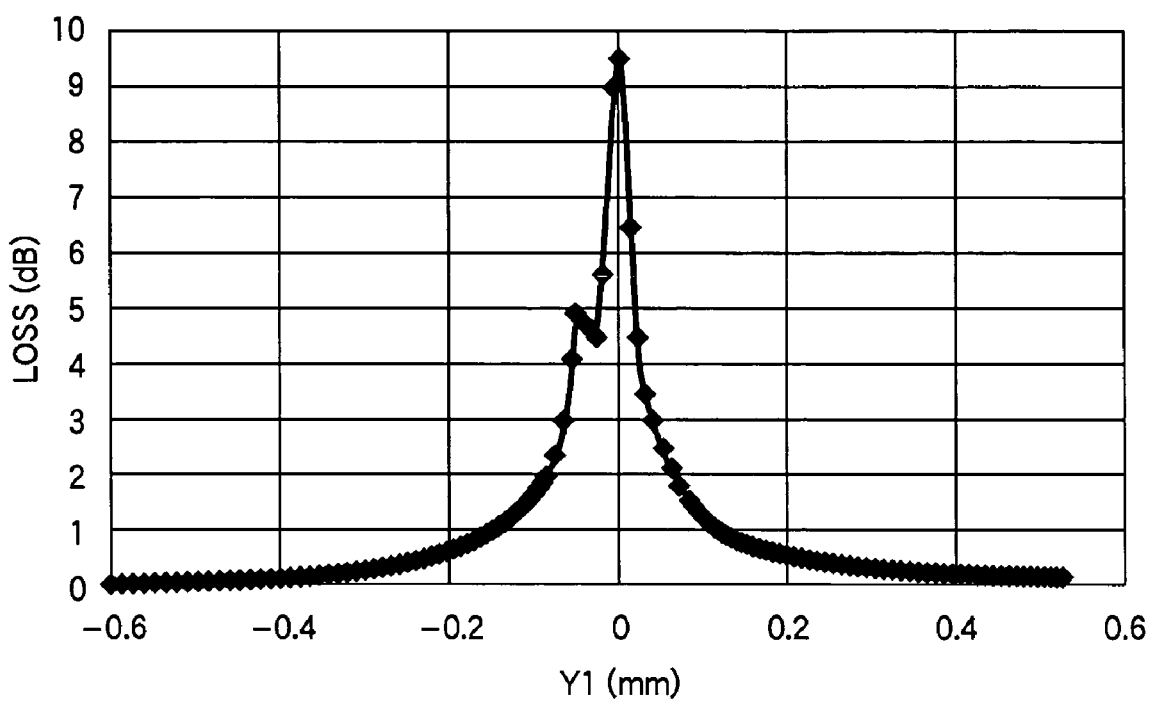
FIG. 18 is a graph showing the magnetic domain structure dependency of the insertion loss of a magneto-optical device.

While the permanent magnets 90f and 90g and the yoke are moved in the ±Y direction relative to the Faraday rotator 20 so as to vary the magnetic domain structure formed in the Faraday rotator 20, the insertion loss of the magneto-optical device is measured. FIG. 18 is a graph showing the magnetic domain structure dependency of the insertion loss of the magneto-optical device shown in FIG. 17. The horizontal axis indicates an Y-coordinate, Y1 (mm) at the boundary interface of the permanent magnets 90f and 90g; and the vertical axis indicates the loss (dB) thereof. The wavelength for measurement is 1550 nm. As in FIG. 18, when the magnetic domain wall I crosses the light input region 34 and the light output region 35 (Y1 is nearly 0), the insertion loss greatly fluctuates to have a maximum value (about 9.4 dB). The insertion loss fluctuation width is about 9.4 dB and is extremely large.

As shown in FIG. 13 to FIG. 18, it is understood that the magnetic domain-wall I (I1 to I3) should not cross the light input region 34 and the light output region 35 in order to reduce the insertion loss fluctuation width of magneto-optical devices. In addition, it is also understood that the magnetization direction is preferably the same in the light input region 34 and the light output region 35 in order to effective reduce the insertion loss of magneto-optical devices. In the magneto-optical device of FIG. 13, the 3-domain structure, but not a 2-domain structure as in FIG. 15, is formed in the Faraday rotator 20, and the magnetization direction is controlled to be the same both in the light input region 34 and in the light output region 35.

In the embodiments of FIG. 2A, FIG. 2B (FIG. 3A, FIG. 3B) and FIG. 9, the magnetic domain wall I does not cross the light input region 34 and the light output region 35. However, as in FIG. 4 and FIG. 10, the loss fluctuation of these embodiments is relatively large. It may be considered that the loss fluctuation would occur because the magnetic domain wall I (I1, I2) is not perpendicular to the light-outgoing face of the Faraday rotator 20. Concretely, when the magnetic domain wall I is inclined relative to the light-outgoing face, or when the magnetic domain wall I is not flat but is curved, then the loss fluctuation may occur. This is because of the slight difference between the refractive index of the magnetic domain A and the refractive index of the magnetic domain B of the Faraday rotator 20. Specifically, since the site at which the light beam enters the magnetic domain wall I varies relatively to the movement of the magnetic domain wall I, the light incident angle to the magnetic domain wall I could not be constant when the magnetic domain wall I is curved, and, as a result, the light path varies owing to the refractivity difference between the magnetic domain A and the magnetic domain B. Even though the magnetic domain wall I is flat, the running direction of light beam varies every time when the light beam is reflected on the total reflection films 30 and 31. Therefore, depending on the position of the magnetic domain wall I, the light incident angle to the magnetic domain wall I may vary, and the light path may therefore vary. In the polarization controller 2" in FIG. 11, the constitution of the magnetic circuit is specifically designed so that the magnetic domain wall I could be flat and could be perpendicular to the light-entering face of the structure. Accordingly, the loss fluctuation is thereby reduced as in FIG. 12.

<Third Embodiment of the Invention>

Figures 20A, 20B:
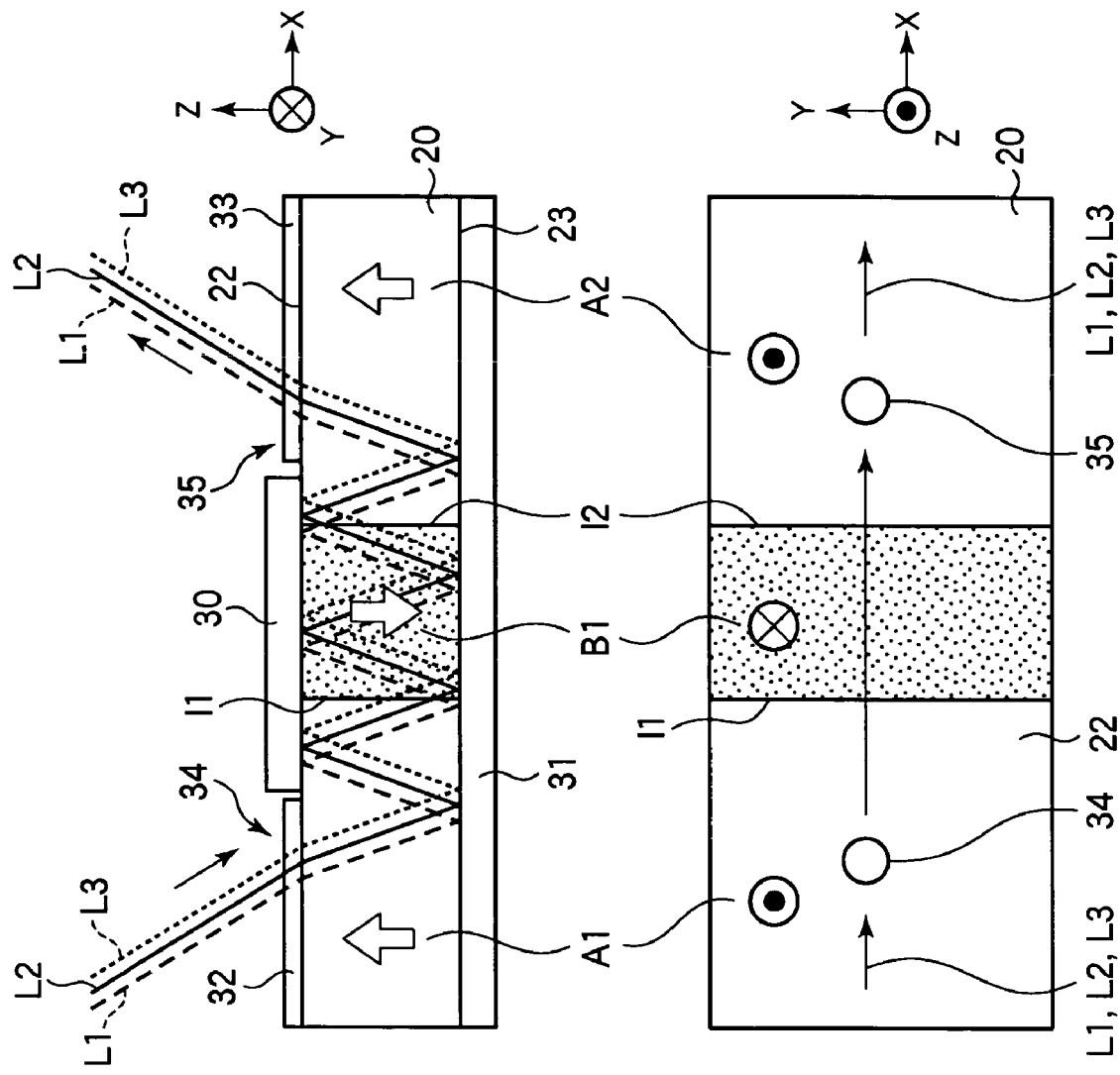
FIG. 20A and FIG. 20B are views showing the outline of an essential part of the magneto-optical device of the third embodiment of the invention.

The magneto-optical device of the third embodiment of the invention is described hereinunder with reference to FIG. 19 to FIG. 20B. FIG. 19 shows the outline of a polarization controller 3 as the magneto-optical device of this embodiment. FIG. 20A and FIG. 20B show the outline of an essential part of the polarization controller 3. The coordinates in FIG. 19 to FIG. 20B are the same as those in FIG. 1 to FIG. 2B. FIG. 20A shows the outline of an essential part of the polarization controller 3 seen in the +Y direction; and FIG. 20B shows the outline of the essential part thereof seen in the −Z direction. As in FIG. 19 to FIG. 20B, the light input region 34 and the light output region 35 are both on one surface 22 of the Faraday rotator 20 in this embodiment. An anti-reflection film 32 (not shown in FIG. 20B) is formed in the vicinity of the light input region 34 of one surface 22 through which a light beam enters the structure. In the other part of the surface 22, formed is a total reflection film 30 (not shown in FIG. 20B). A total reflection film 31 is formed almost entirely on the other surface 23.

As in FIG. 19, the light having been outputted as divergent light from the single mode optical fiber 50 for light input is converted into parallel beams through the lens 54, and enters the light input region 34 of the Faraday rotator 20. The light thus having entered the Faraday rotator 20 runs inside the Faraday rotator 20 while being alternately reflected on the surfaces of the total reflection films 31 and 30, then goes out through the light output region 35, and is collected by the single mode optical fiber 52 for light output, via the lens 56. FIG. 20A and FIG. 20B show a light path L2 on the center axis of parallel light beams; a light path L1 shifted toward the −X direction from the light path L2; and a light path L3 shifted toward the +X direction from the light path L2.

The polarization controller 3 has an electromagnet 40 comprising a C-shaped yoke 42 and a coil 44 wound around the yoke 42. One end 42a of the yoke 42 is disposed adjacent to the back of the total reflection film 30 so that its tip may face the back of the total reflection film 30. The other end 42b of the yoke 42 is disposed adjacent to the back of the total reflection film 31 so that its tip may face the back of the total reflection film 31. A permanent magnet 47 is embedded in the tip of the end 42b (left side in FIG. 19), and a permanent magnet 46 is in the tip of the end 42b (right side in FIG. 19). The tip face 42d of the end 42b, and the surface 46a of the permanent magnet 46, and the surface 47a of the permanent magnet 47 are nearly in the same plane. The magnetization direction of the permanent magnets 46 and 47 is the +Z direction. The permanent magnet 46 and 47 may be in direct contact with the end 42b of the yoke 42, or may be disposed adjacent to the end 42b via an adhesive layer or the like therebetween. The tip face 42c of the end 42a and the tip face 42d of the end 42b are so disposed that they face each other via the Faraday rotator 20 sandwiched therebetween.

The area of the Faraday rotator 20 opposite to the permanent magnet 47 is a magnetic domain A1 magnetized in the +Z direction. The area of the Faraday rotator 20 opposite to the permanent magnet 46 is a magnetic domain A2 magnetized in the same direction as that for the magnetic domain A1. The region between the magnetic domain A1 and the magnetic domain A2 is a magnetic domain B1 magnetized in the opposite direction as that for the magnetic domains A1 and A2 (in the −Z direction). A magnetic domain wall I1 is formed between the region of the magnetic domain A1 and the region of the magnetic domain B1; and a magnetic domain wall I2 is between the region of the magnetic domain A2 and the region of the magnetic domain B1. In this, the light input region 34 is inside the region of the magnetic domain A1; and the light output region 35 is inside the region of the magnetic domain A2. The magnetic field component in the −Z direction applied to the region of the magnetic domain B1 of the Faraday rotator 20 is the strongest in the intermediate part between the magnetic domain wall I1 and the magnetic domain wall I2 (the center part of the Faraday rotator 20), and becomes weaker toward the magnetic domain walls I1 and I2. On the magnetic domain walls I1 and I2, the Z-direction component of the applied magnetic field is 0 (zero).

When a current is made to run through the coil 44 of the electromagnet 40, then a closed magnetic circuit that runs through the yoke 42 and the Faraday rotator 20 is formed, and, for example, a +Z-direction magnetic field is applied to the Faraday rotator 20 in and around the region sandwiched between the two tip faces 42c and 42d of the yoke 42. Accordingly, the boundary region where the Z-direction component of the applied magnetic field becomes 0 (zero) moves toward the center part of the Faraday rotator 20. In other words, the two magnetic domain walls I1 and I2 move to be nearer to each other, and the width of the magnetic domain B1 region becomes narrower in accordance with the intensity of the applied magnetic field. On the other hand, when an opposite current is made to run through the coil 44 of the electromagnet 40, then a −Z-direction magnetic field is applied to the Faraday rotator 20 in and around the region sandwiched between the two tip faces 42c and 42d of the yoke 42. Accordingly, the boundary region where the Z-direction component of the applied magnetic field becomes 0 (zero) moves remoter from the center part of the Faraday rotator 20. In other words, the two magnetic domain walls I1 and I2 move to be remoter from each other, and the width of the magnetic domain B1 region becomes broader in accordance with the intensity of the applied magnetic field. In the constitution of this embodiment, the two tip faces 42c and 42d of the yoke are disposed relatively in the vicinity of each other, and therefore a magnetic field of the intended intensity may be applied thereto even at a low current level.

The polarization rotation angle that is formed when light passes through the Faraday rotator 20 is proportional to the difference between the optical path length in the magnetic domains A1 and A2 formed by the +Z-direction magnetization and the optical path length in the magnetic domain B1 formed by the −Z-direction magnetization. Accordingly, like in the embodiment 2, the polarization rotation angle can be variable when a variable magnetic field is applied by the electromagnet 40 while the light input region 34 is kept positioned in the magnetic domain A1 and the light output region 35 is in the magnetic domain A2, to thereby move the magnetic domain walls I1 and I2, then the polarization plane of the light beam having entered the Faraday rotator 20 can be rotated by a desired angle before it goes out of the device.

Like the second embodiment, this embodiment realizes small-sized, power-saving, high-performance and low-cost electro-magnetic structures.

<Fourth Embodiment of the Invention>

Figure 21:
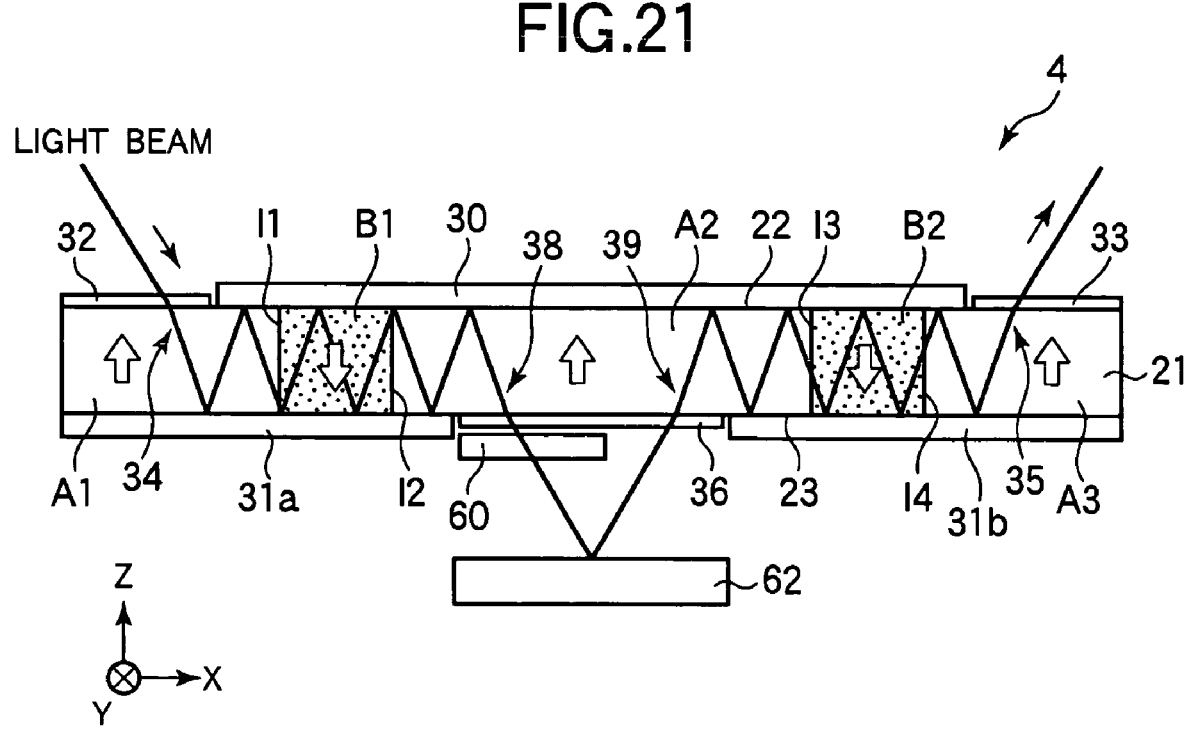
FIG. 21 is a view showing the outline of a magneto-optical device of the fourth embodiment of the invention.
Figure 22:
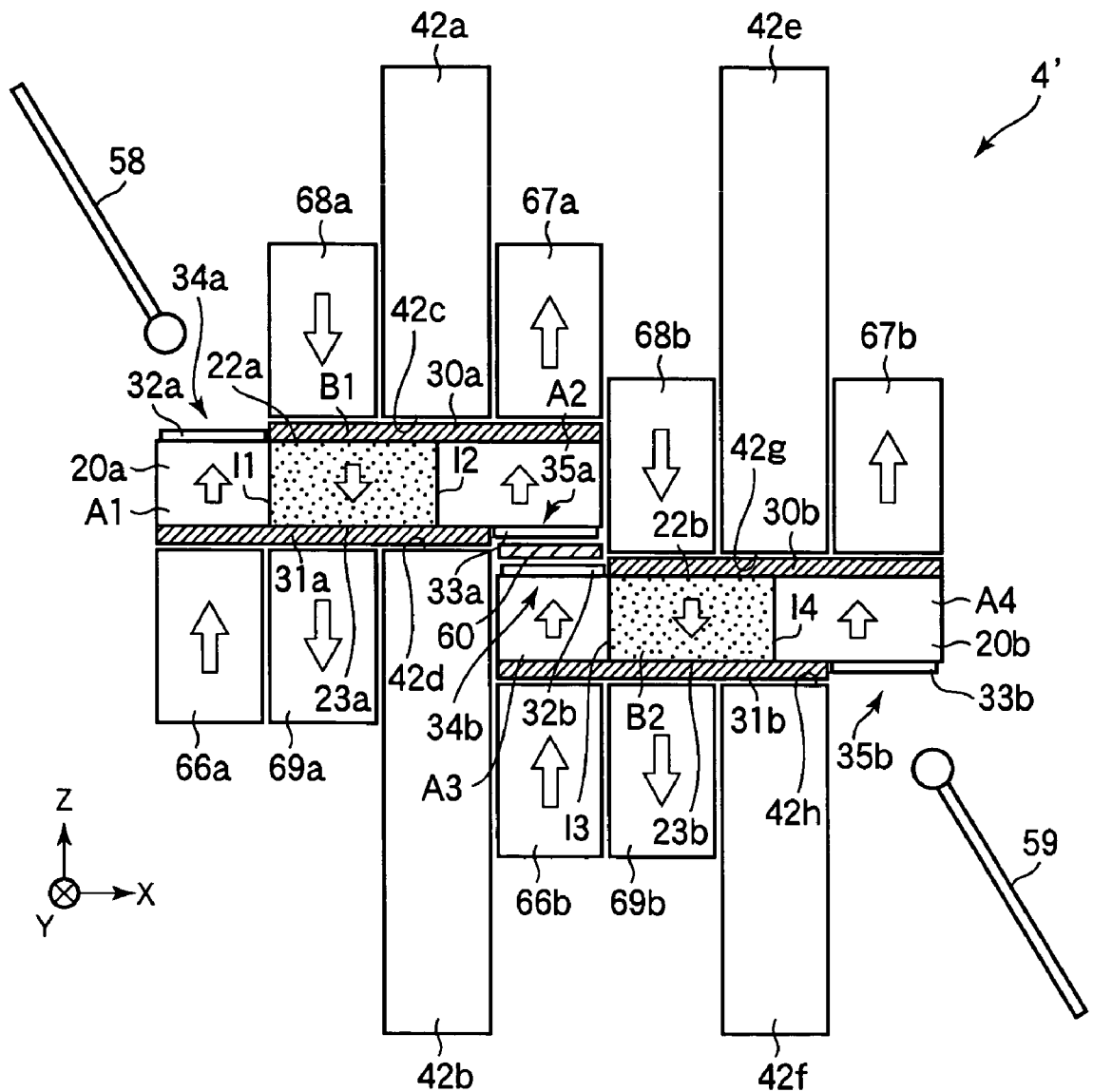
FIG. 22 is a view showing the outline of a modification of the magneto-optical device of the fourth embodiment of the invention.

The magneto-optical device of the fourth embodiment of the invention is described hereinunder with reference to FIG. 21 and FIG. 22. The polarization controller for use in PMD compensators is required to be an endless tracking-type one capable of continuously following any and every polarization variation, not being saturated with it (see Non-Patent Document 1). In such an endless tracking-type polarization controller, in general, needed are multiple Faraday rotators (variable Faraday rotators) and multiple ¼ wavelength plates to be disposed between the neighboring Faraday rotators.

FIG. 21 shows the outline of an essential part of a polarization controller 4 as the magneto-optical device of this embodiment. The coordinates in FIG. 21 are the same as those in FIG. 1, FIG. 2A and FIG. 2B. As in FIG. 21, the polarization controller 4 of this embodiment has one Faraday rotator 21. The Faraday rotator 21 has a nearly rectangular parallelepiped form, and has surfaces 22 and 23 opposite to each other and both parallel to the X,Y planes. An anti-reflection film 32 is formed in the vicinity of the light input region 34 of one surface 22 through which a light beam enters the structure; and an anti-reflection film 33 is formed in the vicinity of the light output region 35 through which the light beam goes out of the structure. In the other part of the surface 22, formed is a total reflection film 30. On a part of the other surface 23, formed is an anti-reflection film 36 in the vicinity of the light output region 38 through which the light beam goes out of the structure and of the light input region 39 through which the light beam enters the structure; and on the other part of the surface 23, formed are total reflection films 31a and 31b.

The light beam having entered the Faraday rotator 21 through the light input region 34 thereof alternately reflects on the total reflection films 31a and 30, and once goes out through the light output region 38. The light beam thus having gone out through the light output region 38 passes through the ¼ wavelength plate 60, and reflects on the reflector 62, and again enters the Faraday rotator 21 through the light input region 39 thereof. The light beam thus having again entered the Faraday rotator 21 through the light input region 39 thereof then alternately reflects on the total reflection films 30 and 31b, and goes out through the light output region 35.

A predetermined magnetic field is given to the Faraday rotator 21 by a permanent magnet (not shown). Accordingly, the area around the light input region 34 of the Faraday rotator 21 is a magnetic domain A1 magnetized in the +Z direction. The area in the vicinity of the light input region 38 and the light output region 39 of the Faraday rotator 21 is a magnetic domain A2 magnetized in the same direction as that for the magnetic domain A1. The area in the vicinity of the light output region 35 of the Faraday rotator 21 is a magnetic domain A3 magnetized in the same direction as that for the magnetic domains A1 and A2. The region between the magnetic domain A1 and the magnetic domain A2 of the Faraday rotator 21 is a magnetic domain B1 magnetized in the opposite direction as that for the magnetic domains A1, A2 and A3 (in the −Z direction). The region between the magnetic domain A2 and the magnetic domain A3 of the Faraday rotator 21 is a magnetic domain B2 magnetized in the same direction as that for the magnetic domain B1. A magnetic domain wall I1 is formed between the region of the magnetic domain A1 and the region of the magnetic domain B1; and a magnetic domain wall I2 is between the region of the magnetic domain A2 and the region of the magnetic domain B1. A magnetic domain wall I3 is formed between the region of the magnetic domain A2 and the region of the magnetic domain B2; and a magnetic domain wall I4 is between the region of the magnetic domain A3 and the region of the magnetic domain B2.

When a +Z-direction magnetic field of a predetermined intensity is applied around the region of the magnetic domain B1 by an electromagnet (not shown), then the magnetic domain walls I1 and I2 move to be nearer to each other, and the width of the magnetic domain B1 becomes narrower in accordance with the intensity of the applied magnetic field. Similarly, when a +Z-direction magnetic field of a predetermined intensity is applied around the region of the magnetic domain B2, then the magnetic domain walls I3 and I4 move to be nearer to each other, and the width of the magnetic domain B2 becomes narrower in accordance with the intensity of the applied magnetic field.

The polarization rotation angle that is formed when light passes through the Faraday rotator 21 is proportional to the difference between the optical path length in the magnetic domain A (A1, A2, A3) formed by the +Z-direction magnetization and the optical path length in the magnetic domain B (B1, B2) formed by the −Z-direction magnetization. Accordingly, when a variable magnetic field is applied by an electromagnet, for example, in the +Z direction, while the light input region 34 is kept positioned in the magnetic domain A1, the light output region 38 and the light input region 39 are in the magnetic domain A2 and the light output region 35 is in the magnetic domain A3, to thereby move the magnetic domain walls I1, I2, I3 and I4 so as to vary the width of the magnetic domains B1 and B2, then the difference between the light path length in the magnetic domain A and the light path length in the magnetic domain B may be varied and the polarization rotation angle may be thereby variable. In this embodiment, one Faraday rotator 21 is so designed that the left side part and the right side part thereof in the drawing may function as different Faraday rotators. When the light beam having gone out through the light output region 35 is reflected on the other reflector and again enters the Faraday rotator 21, then one Faraday rotator 21 could function as three (or more) Faraday rotators. Accordingly, one Faraday rotator 21 may form an endless tracking-type polarization controller. Like the second embodiment thereof, this embodiment of the invention realizes small-sized, power-saving, high-performance and low-cost magneto-optical devices.

FIG. 22 shows the outline of a modification of the magneto-optical device of this embodiment. As in FIG. 22, the polarization controller 4' of this modification has, for example, two Faraday rotators 20a and 20b. The two Faraday rotators 20a and 20b are so disposed that the light output region 35a of the Faraday rotator 20a and the light input region 34b of the Faraday rotator 20b may face each other via a ¼ wavelength plate 60 therebetween. The light having gone out through the light output region 35a of the Faraday rotator 20a passes through the ¼ wavelength plate 60, and then enters the Faraday rotator 20b through the light input region 34b thereof. The Faraday rotator 20a has surfaces 22a and 23a opposite to each other and both parallel to the X,Y planes. An anti-reflection film 32a is formed in the vicinity of the light input region 34a of one surface 22a through which a light beam from a lensed optical fiber 58 enters the structure. In the other part of the surface 22a, formed is a total reflection film 30a. An anti-reflection film 33a is formed in the vicinity of the light output region 35a of the other surface 23a; and in the other part of the surface 23a, formed is a total reflection film 31a. One end 42a of the yoke of the electromagnet that applies a variable magnetic field to the Faraday rotator 20a is disposed adjacent to the back of the total reflection film 30a so that its tip face 42c may face the back of the total reflection film 30a. The other end 42b of the yoke is disposed adjacent to the back of the total reflection film 31a so that its tip face 42d may face the back of the total reflection film 31a. The yoke is so disposed that the tip face 42c of one end 42a thereof and the tip face 42d of the other end 42b thereof may face each other via the Faraday rotator 20a sandwiched therebetween.

A permanent magnet 67a is disposed in the +X direction of the end 42a; and a permanent magnet 68a is in the −X direction of the end 42a. The magnetization direction of the permanent magnet 67a is the +Z direction; and the magnetization direction of the permanent magnet 68a is the −Z direction. A permanent magnet 69a is disposed in the −X direction of the end 42b; and a permanent magnet 66a is in the −X direction beyond the permanent magnet 69a. The magnetization direction of the permanent magnet 69a is the −Z direction; and the magnetization direction of the permanent magnet 66a is +Z direction. The area around the light input region 34a of the Faraday 20a is a magnetic domain A1 formed by the +Z direction magnetization; and the area around the light output region 35a is a magnetic domain A2 magnetized in the same direction as that for the magnetic domain A1. The region between the magnetic domain A1 and the magnetic domain A2 is a magnetic domain B1 magnetized opposite to that for the magnetic domains A1 and A2. A magnetic domain wall I1 is formed between the magnetic domain A1 and the magnetic domain B1; and a magnetic domain wall I2 is between the magnetic domain B1 and the magnetic domain A2. In the structure of this embodiment, the permanent magnet 66a is disposed corresponding to the magnetic domain A1; the permanent magnets 68a and 69a are corresponding to the magnetic domain B1; and the permanent magnet 67a is corresponding to the magnetic domain A2.

The Faraday rotator 20b has surfaces 22b and 23b opposite to each other and both parallel to the X,Y planes. An anti-reflection film 32b is formed in the vicinity of the light input region 34b of one surface 22b. In the other part of the surface 22b, formed is a total reflection film 30b. An anti-reflection film 33b is formed in the vicinity of the light output region 35b of the other surface 23b through which the light goes out toward the side of the lensed optical fiber 59; and in the other part of the surface 23b, formed is a total reflection film 31b. One end 42e of the yoke of the electromagnet that applies a variable magnetic field to the Faraday rotator 20b is disposed adjacent to the back of the total reflection film 30b so that its tip face 42g may face the back of the total reflection film 30b. The other end 42f of the yoke is disposed adjacent to the back of the total reflection film 31b so that its tip face 42h may face the back of the total reflection film 31b. The yoke is so disposed that the tip face 42g of the end 42e thereof and the tip face 42h of the end 42f thereof may face each other via the Faraday rotator 20b sandwiched therebetween.

A permanent magnet 67b is disposed in the +X direction of the end 42e; and a permanent magnet 68b is in the −X-direction of the end 42e. The magnetization direction of the permanent magnet 67b is the +Z direction; and the magnetization direction of the permanent magnet 68b is the −Z direction. A permanent magnet 69b is disposed in the −X direction of the end 42f; and a permanent magnet 66b is in the −X direction beyond the permanent magnet 69b. The magnetization direction of the permanent magnet 69b is the −Z direction; and the magnetization direction of the permanent magnet 66b is +Z direction. The area around the light input region 34b of the Faraday 20b is a magnetic domain A3 formed by the +Z direction magnetization; and the area around the light output region 35b is a magnetic domain A4 magnetized in the same direction as that for the magnetic domain A3. The region between the magnetic domain A3 and the magnetic domain A4 is a magnetic domain B2 magnetized opposite to that for the magnetic domains A3 and A4. A magnetic domain wall I3 is formed between the magnetic domain A3 and the magnetic domain B2; and a magnetic domain wall I4 is between the magnetic domain B2 and the magnetic domain A4. In the structure of this embodiment, the permanent magnet 66b is disposed corresponding to the magnetic domain A3; the permanent magnets 68b and 69b are corresponding to the magnetic domain B2; and the permanent magnet 67b is corresponding to the magnetic domain A4.

Compared with the polarization controller 4 of FIG. 21, the polarization controller 4' of this modification requires the two Faraday rotators 20a and 20b, but does not require the reflector 62 that must be disposed accurately in point of the disposition angle thereof. Therefore, the polarization controller 4' has the advantages in that it is easy to construct, and it may be readily small-sized. As illustrated, the polarization controller 4' has a two-stage structure comprising the two Faraday rotators 20a and 20b, but it may have a three-stage or more multi-stage structure comprising three or more Faraday rotators.

In this embodiment, the polarization controllers 4 and 4' are described for the magneto-optical device of the invention. When a polarizer is disposed before and after each Faraday rotator and when the constitutive components are connected to each other in a mode of multi-stage interconnection, then the embodiment may realize a variable filter that utilizes the wavelength dependency of the polarization rotation angle of the rotators. In this embodiment, the multiple reflection employed enables to broaden the variable width of the polarization rotation angle of the rotators, and therefore this embodiment is suitable to variable filters.

<Fifth Embodiment of the Invention>

Figure 23:
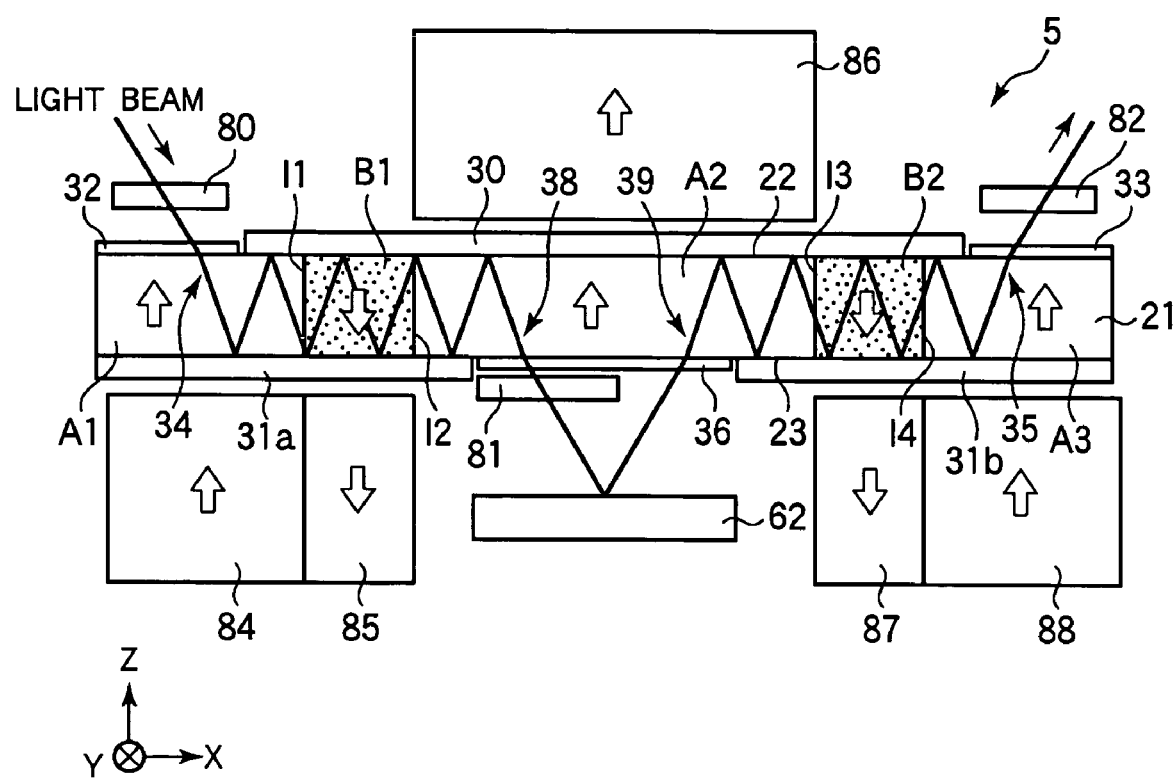
FIG. 23 is a view showing the outline of a magneto-optical device of the fifth embodiment of the invention.

The magneto-optical device of the fifth embodiment of the invention is described hereinunder with reference to FIG. 23. The embodiments mentioned above are for variable magneto-optical devices with electromagnet, to which, however, the invention is not limited. For example, electromagnet may not be used, and the position of permanent magnet may be controlled to optimize the polarization rotation angle of the rotator. With that, the permanent magnet may be fixed, and the constitution may be applied to optical isolators and optical circulators. According to this constitution, the insertion loss may be reduced and the polarization rotation angle may be delicately controlled, and therefore the constitution realizes high-isolation, high-performance two-staged optical isolators and optical circulators. Concretely, for example, a polarizer may be disposed before and after a magneto-optical crystal, and a combination of an ordinary polarizer and an ordinary Faraday rotator device may be applied to this constitution. The permanent magnet in the constitution may be moved so that the magnetic domains could be thereby moved.

FIG. 23 shows the outline of an optical isolator 5 as the magneto-optical device of this embodiment. In this embodiment, for example, the ¼ wavelength plate 60 as in the constitution of FIG. 21 is replaced with a polarizer 81, and polarizers 80 and 82 are disposed before the anti-reflection film 32 (on the light input side) and after the anti-reflection film 33 (on the light output side), as in FIG. 23. Permanent magnets 84 and 85 are disposed in that order from the left in the site opposite to the left side region in the drawing of the surface 23 of the Faraday rotator 21. The magnetization direction of the permanent magnet 84 is the +Z direction; and the magnetization direction of the permanent magnet 85 is the −Z direction. Permanent magnets 87 and 88 are disposed in that order from the left in the site opposite to the right side region in the drawing of the surface 23 of the Faraday rotator 21. The direction of the magnetic flux inside the permanent magnet 87 is the −Z direction; and the direction of the magnetic flux inside the permanent magnet 88 is the +Z direction. A permanent magnet 86 is disposed in the site opposite to the vicinity of the center part of the surface 22 of the Faraday rotator 21. The magnetization direction of the permanent magnet 86 is the +Z direction. These permanent magnets 84, 85, 86, 87 and 88 are fixed after their positions are so controlled that the magnetic domain walls I1, I2, I3 and I4 in the Faraday rotator 21 could be in the desired positions. In this modification, only one magneto-optical crystal realizes two-stage structured optical isolators and optical circulators, and the modification has the advantages of simple construction and low cost. Similarly, this modification may also realize three-stage or more multi-stage optical isolators and optical circulators.

The magneto-optical crystal that may be utilized in the first to fifth embodiments must have a magnetic easy axis in the direction perpendicular to the surfaces 22 and 23. In the above-mentioned embodiments, the external magnetic field is discussed only for the component thereof perpendicular to the surfaces 22 and 23 (Z direction component). This is because, in the magneto-optical crystal of vertical magnetization, the vertical direction component of the magnetic field almost determines the magnetic domain structure thereof. There exist in-plane direction magnetic field components that are parallel to the surfaces 22 and 23 (X-direction component, and Y-direction component), but they do not have any significant influence on the magnetic domain structure.

<Sixth Embodiment of the Invention>

Figure 24:
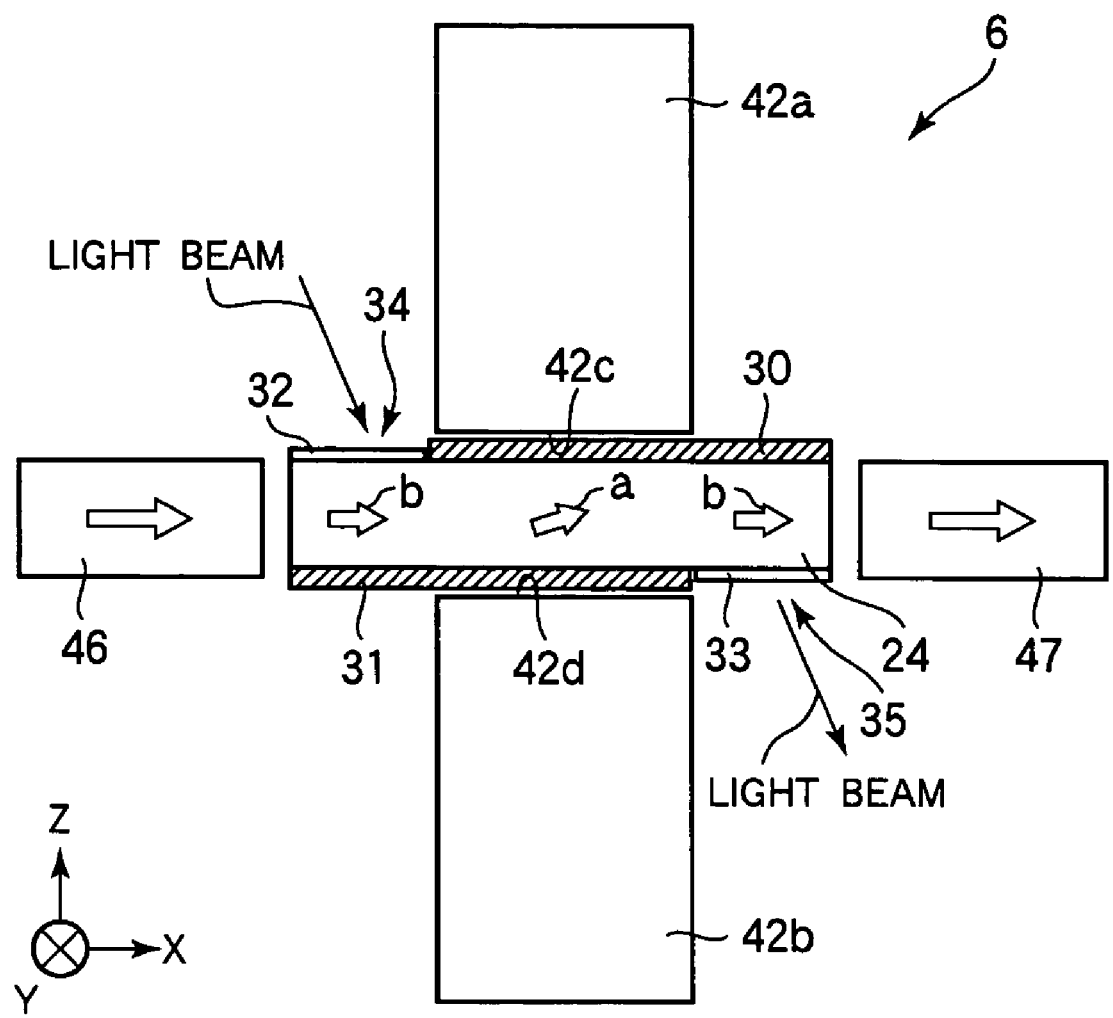
FIG. 24 is a view showing the outline of an essential part of the magneto-optical device of the sixth embodiment of the invention.
Figure 25A:
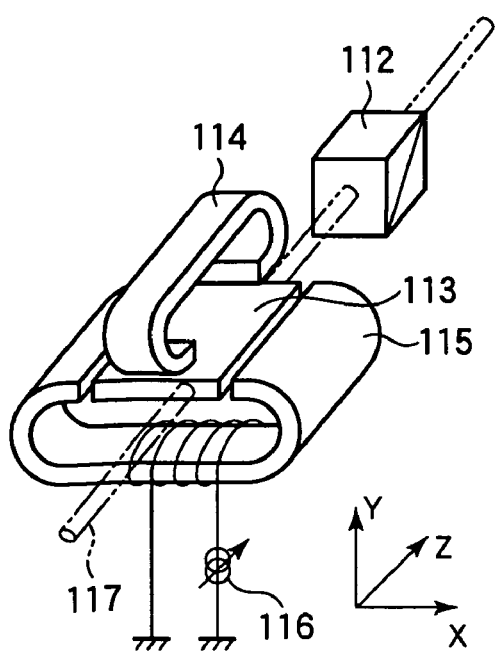
FIG. 25A and FIG. 25B are views for explaining the outline constitution and the operation principle of an ordinary magneto-optical device.
Figure 25B:
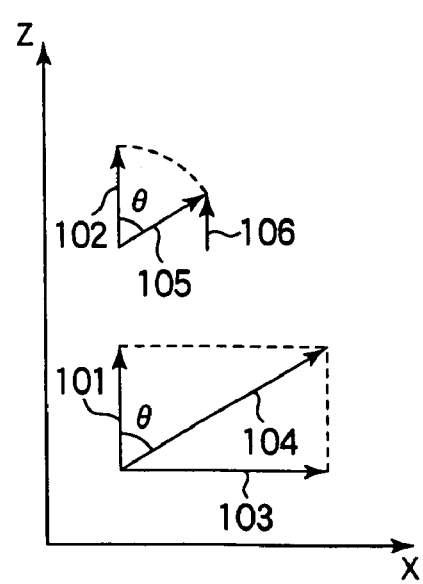

The magneto-optical device of the sixth embodiment of the invention is described hereinunder with reference to FIG. 24. FIG. 24 shows the outline of a polarization controller 6 as the magneto-optical device of this embodiment. The coordinates in FIG. 24 are the same as those in FIG. 1 to FIG. 2B. As in FIG. 24, the polarization controller 6 of this embodiment has one Faraday rotator 24. In this embodiment, employed is a magnetization rotation system of controlling the polarization rotation angle by rotating the magnetization of the structure, as described hereinunder. Accordingly, the Faraday rotator 24 is formed of a magnetic garnet single-crystal film having been heated at 1000° C. or so for a few hours and therefore not having growth-induced magnetic anisotropy.

The polarization controller 6 has permanent magnets 46 and 47, a yoke (only the two ends 42a and 42b of the yoke are shown in FIG. 24), and a coil wound around the yoke. The permanent magnet 46 is disposed in the −X direction of the Faraday rotator 24; and the permanent magnet 47 is in the +X direction of the Faraday rotator 24. The magnetization direction of the permanent magnets 46 and 47 is both the +X direction. The yoke is so disposed that its one end 42a is disposed adjacent to the back of the total reflection film 30 so that the tip face 42c of the end 42a thereof faces the back of the total reflection film 30 formed on one surface of the Faraday rotator 24. The other end 42b of the yoke is disposed adjacent to the back of the total reflection film 31 so that the tip face 42d of the end 42b faces the back of the total reflection film 31 formed on the other surface of the Faraday rotator 24. The tip face 42c of the end 42a faces the tip face 42d of the end 42b via the Faraday rotator 24 sandwiched therebetween.

When no current runs through the coil of the electromagnet, then the Faraday rotator 24 receives a magnetic field in the +X direction given thereto by the permanent magnets 46 and 47, and the intensity of the magnetic field that the rotator receives is not lower than that of the saturation magnetic field. Accordingly, the Faraday rotator 24 is magnetized in the +X direction, and is in a condition of saturation magnetization. Since the Faraday rotation angle depends on the Z-direction component of the magnetization of the rotator, the Faraday rotation angle is nearly 0 (zero) when no current runs through the coil. When a current is made to run through the coil, then the region of the Faraday rotator 24 sandwiched between the two ends 42a and 42b of the yoke receives a variable magnetic field, for example, in the +Z direction given by the electromagnet. Specifically, the external magnetic field applied to the region of the Faraday rotator 24 is the synthetic magnetic field composed of the +X-direction magnetic field given by the permanent magnets 46 and 47 and the variable magnetic field in the +Z direction given by the electromagnet. When the current running through the coil is varied and when the direction of the synthetic magnetic field that is stronger than the saturation magnetic field is varied, then the direction-of the magnetization (arrow a in the drawing) in the region of the Faraday rotator 24 sandwiched between the two ends 42a and 42b of the yoke may vary while the condition of saturation magnetization is kept as such, and the Z-direction component of the magnetization is thereby varied. Since the Faraday rotation angle varies depending on the Z-direction component of the magnetization, the Faraday rotation angle may be controlled by controlling the current that runs through the coil. In this embodiment, the area around the light input region 34 and the light output region 35 of the Faraday rotator 24 receives little magnetic field from the electromagnet. Accordingly, the direction of the magnetization in the area around the light input region 34 and the light output region 35 (arrow b in the drawing) does not vary and is still the +X direction.

In this embodiment, the direction of the magnetization in the area around the light input region 34 of the Faraday rotator 24 is the same as that in the area around the light output region 35 thereof. Accordingly, since the polarization rotation angle is everywhere the same in all the light paths of the parallel light beams, there occurs no diffraction loss when the light having passed through the Faraday rotator 24 is collected in the optical fiber for light output. In this embodiment, in addition, the Faraday rotator 24 does not have a magnetic domain wall I. Needless-to-say, therefore, no magnetic domain wall crosses the light input region 34 and the light output region 35, and the insertion loss fluctuation width can be thereby reduced. Accordingly, the magneto-optical device of this embodiment is applicable to polarization controllers that require a low degree of loss and a narrow loss fluctuation width.

In this embodiment, since the two ends 42a and 42b of the yoke are disposed adjacent to the total reflection films 30 and 31, respectively, a variable magnetic field can be efficiently imparted to the Faraday rotator 24. Accordingly, this embodiment realizes a small-sized and power-saving magneto-optical device. In addition, since the Faraday rotator 24 is all the time used in the saturation magnetization range in this embodiment, the polarization rotation angle may be varied with good reproducibility with no hysteresis.

Down-sizing and power-saving are relatively difficult for the magnetization rotation system employed in this embodiment. However, in this embodiment, since the light path length in the Faraday rotator 24 is prolonged owing to the multiple reflection therein, a large polarization rotation angle can be obtained even when the rotation angle for magnetization is small, and, in addition, a broad variable range is obtainable for the polarization rotation angle. Accordingly, this embodiment realizes relatively small-sized and power-saving magneto-optical devices even though the magnetization rotation system is used.

In the first to sixth embodiments mentioned above, the beam diameter of the light beam must be reduced to such a degree that the light beams for multiple reflection do not overlap with each other. However, when the beam diameter reduces, then the light beam may readily expand through diffraction. Therefore, the beam diameter must be defined within a suitable range. The suitable beam diameter varies, depending on the thickness of the magneto-optical crystal used and the incident angle of the light into the crystal. In practice, however, the beam diameter may be suitably from 40 to 100 $\mu$m or so. Regarding the optical system that uses light beams having such a small beam diameter, referred to are the optical systems with lenses 54 and 56 disposed separately from the optical fibers 50 and 52, as in FIG. 5 and FIG. 19; the lensed optical fibers 58 and 59 where the lens and the fiber are integrated together, as in FIG. 22; and other optical systems of core-expanded optical fibers where the core at the tip of the optical fiber is expanded under heat. The lensed optical fibers 58 and 59 and the core-expanded optical fibers are suitable for small-sized structures as compared with the others where a lens is disposed separately, and they can be constructed in a simplified manner.

The "magneto-optical devices" as referred to in this description include not only devices that comprise a magneto-optical crystal and a magnetic field application unit but also any others that optionally contain a lens, an optical wave guide mechanism (optical fiber, optical waveguide), an electrode for current application, and a housing for holding them therein.

Not limited to the above-mentioned embodiments, the present invention encompasses various changes and modifications.

In the above-mentioned embodiments, for example, polarization controllers and optical modulators are referred to for the magneto-optical devices, to which, however, the invention is not limited. The invention is applicable to any other magneto-optical devices, such as variable optical attenuators where the current to run through the coil 44 of the electromagnet 40 is varied to thereby variably control the quantity of light attenuation. For example, when the constitution of FIG. 5 is applied to such a variable optical attenuator, then a polarizer is disposed between the lens 54 and the Faraday rotator 20 and an analyzer is disposed between the Faraday rotator 20 and the lens 56.

In addition, the permanent magnet may be disposed in any desired manner so far as the same magnetic domain structure as in the above-mentioned embodiments may be formed in the Faraday rotator 20. For example, two permanent magnets each having opposite magnetic poles may be kept adjacent to each other and disposed at the top of the ends 42a and 42b.

In the above-mentioned embodiments, the permanent magnets 46 and 47 are disposed to be in contact with or adjacent to the yoke 42, to which, however, the invention is not limited. For example, the permanent magnet 46 and 47 may be spaced from the yoke 42 and disposed in the ±X direction of the Faraday rotator 20, and the same magnetic domain structure as in the above-mentioned embodiments may be formed in the Faraday rotator 20.

In the above-mentioned embodiments, a magnetic garnet single-crystal film grown in a method of LPE is used to produce the Faraday rotator, to which, however, the invention is not limited. For example, magnetic garnet and ortho-ferrite produced in a flux process, a FZ process or a solid-phase process may also be used herein.

What is claimed is:

1. A magneto-optical device comprising:
    a magneto-optical crystal having first and second surfaces opposite to each other;
    a first total reflection part disposed at least partly on the first surface side of the magneto-optical crystal;
    a second total reflection part disposed at least partly on the second surface side of the magneto-optical crystal;
    a light input region in which light enters the magneto-optical crystal;
    a light output region in which the light reflected alternately in the first and second total reflection parts goes out of the magneto-optical crystal; and
    a magnetic field application structure of applying a magnetic field to the magneto-optical crystal in such a manner that there exists no magnetic domain wall in the light input region and the light output region.

2. The magneto-optical device as claimed in claim 1, wherein the magnetic field application structure applies a magnetic field to the magneto-optical crystal in such a manner that the magnetization direction is the same both in the light input region and in the light output region.

3. The magneto-optical device as claimed in claim 1, wherein the light input region is on the first surface, and the light output region is on the second surface.

4. The magneto-optical device as claimed in claim 1, wherein the light input region and the light output region are both on the first surface.

5. The magneto-optical device as claimed in claim 1, wherein the magneto-optical crystal has a predetermined magnetic easy axis, and includes a magnetic domain A magnetized in one direction parallel to the magnetic easy axis and a magnetic domain B magnetized in the opposite direction to the magnetization direction of the magnetic domain A.

6. The magneto-optical device as claimed in claim 5, wherein the magnetic field application structure comprises an electromagnet capable of varying a position in which the magnetic field component applied to the magneto-optical crystal in parallel to the magnetic easy axis is 0 (zero), and at least one permanent magnet disposed correspondingly to every magnetic domain of the magneto-optical crystal.

7. The magneto-optical device as claimed in claim 1, wherein the magnetic field application structure comprises at least one permanent magnet of applying a fixed magnetic field to the magneto-optical crystal, and an electromagnet of applying thereto a variable magnetic field in the direction different from the direction of the fixed magnetic field, and the structure varies the intensity of the variable magnetic field so that the intensity of the synthetic magnetic field of the variable magnetic field and the fixed magnetic field is not lower than the intensity of the saturation magnetic field of the magneto-optical crystal, and varies the magnetization direction of the magneto-optical crystal.

8. A magneto-optical device comprising:
    a magneto-optical crystal having first and second surfaces opposite to each other;
    a first total reflection part disposed at least partly on the first surface side of the magneto-optical crystal;
    a second total reflection part disposed at least partly on the second surface side of the magneto-optical crystal;
    a light input region in which light enters the magneto-optical crystal;
    a light output region in which the light reflected alternately on the surfaces of the first and second total reflection parts goes out of the magneto-optical crystal; and
    a magnetic field application structure that comprises an electromagnet having a yoke with one end thereof disposed adjacent to the back face of the first total reflection part and the other end thereof disposed adjacent to the back of the second total reflection part, and a coil wound around the yoke, and capable of applying a variable magnetic field to the magneto-optical crystal, and at least one permanent magnet of applying a fixed magnetic field to the magneto-optical crystal.

9. The magneto-optical device as claimed in claim 8, wherein the magneto-optical crystal has a predetermined magnetic easy axis, and includes a magnetic domain A magnetized in one direction parallel to the magnetic easy axis and a magnetic domain B magnetized in the opposite direction to the magnetization direction of the magnetic domain A.

10. The magneto-optical device as claimed in claim 8, wherein the direction of the variable magnetic field differs from the direction of the fixed magnetic field, and the magnetic field application structure varies the intensity of the variable magnetic field so that the intensity of the synthetic magnetic field of the variable magnetic field and the fixed magnetic field is not lower than the intensity of the saturation magnetic field of the magneto-optical crystal, and varies the magnetization direction of the magneto-optical crystal.

* * * * *